United States Patent
Fan et al.

(10) Patent No.: US 12,372,749 B2
(45) Date of Patent: Jul. 29, 2025

(54) IMAGING LENS ASSEMBLY MODULE AND ELECTRONIC DEVICE

(71) Applicant: LARGAN PRECISION CO., LTD., Taichung (TW)

(72) Inventors: Chen-Wei Fan, Taichung (TW); Chun-Hua Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 589 days.

(21) Appl. No.: 17/749,213

(22) Filed: May 20, 2022

(65) Prior Publication Data
US 2022/0404583 A1  Dec. 22, 2022

Related U.S. Application Data

(60) Provisional application No. 63/211,037, filed on Jun. 16, 2021.

(51) Int. Cl.
G02B 13/00 (2006.01)
G02B 7/02 (2021.01)
G02B 5/20 (2006.01)

(52) U.S. Cl.
CPC ......... *G02B 13/0015* (2013.01); *G02B 7/021* (2013.01); *G02B 13/0065* (2013.01); *G02B 5/208* (2013.01)

(58) Field of Classification Search
CPC .............. G02B 13/0015; G02B 7/021; G02B 13/0065; G02B 5/208; G02B 13/004; G02B 13/0055
See application file for complete search history.

(56) References Cited

U.S. PATENT DOCUMENTS

| 10,598,890 B2 | 3/2020 | Kim et al. |
| 11,199,677 B2 | 12/2021 | Chang et al. |
| 2012/0243093 A1* | 9/2012 | Tonar ............... H10N 30/20 359/507 |
| 2021/0058502 A1* | 2/2021 | Liao .................. G06F 1/1616 |

(Continued)

FOREIGN PATENT DOCUMENTS

| CN | 206773267 U | 12/2017 |
| CN | 209895062 U | 1/2020 |

(Continued)

*Primary Examiner* — Mariam Qureshi
(74) *Attorney, Agent, or Firm* — McClure, Qualey & Rodack, LLP

(57) ABSTRACT

The present disclosure provides an imaging lens assembly module including a baseplate and an imaging lens assembly. The imaging lens assembly includes an imaging lens set and a barrel. The imaging lens set includes at least one lens element. The at least one lens element includes two first trimmed surfaces. The barrel includes a barrel portion and a base portion. The barrel portion has a first inner surface, and the barrel portion includes two second trimmed surfaces. The barrel portion and the base portion are formed integrally, a shortest distance is defined between the first trimmed surfaces of the lens element, a shortest distance is defined between the second trimmed surfaces of the barrel portion, and the optical axis passes vertically through the shortest distance between the first trimmed surfaces and the shortest distance between the second trimmed surfaces.

20 Claims, 23 Drawing Sheets

(56) References Cited

U.S. PATENT DOCUMENTS

| | | | | |
|---|---|---|---|---|
| 2022/0317410 A1* | 10/2022 | Yang | .................... | G02B 7/021 |
| 2023/0148183 A1* | 5/2023 | Cohen | .................... | G03B 17/17 |
| | | | | 359/726 |
| 2023/0350159 A1* | 11/2023 | Wang | ................. | G02B 13/0065 |
| 2023/0353849 A1* | 11/2023 | Kim | ........................ | G03B 5/00 |

FOREIGN PATENT DOCUMENTS

| | | |
|---|---|---|
| CN | 210123493 U | 3/2020 |
| CN | 210123494 U | 3/2020 |
| CN | 112243077 A | 1/2021 |
| JP | 2019519967 A | 7/2019 |
| TW | M502181 U | 6/2015 |
| TW | 201910856 A | 3/2019 |
| TW | I730639 B | 6/2021 |

\* cited by examiner

IMAGING LENS ASSEMBLY MODULE AND ELECTRONIC DEVICE

RELATED APPLICATIONS

This application claims priority to U.S. Provisional Application Ser. No. 63/211,037 filed Jun. 16, 2021, which is herein incorporated by reference.

BACKGROUND

Technical Field

The present disclosure relates to an imaging lens assembly module. More particularly, the present disclosure relates to an imaging lens assembly module which can be applied to portable electronic devices.

Description of Related Art

In recent years, due to portable electronic devices are developed quickly, such as smart electronic devices, tablets and notebook computers, etc., can be found throughout modern people's whole lives, and the imaging lens assemblies applied to portable electronic devices have also flourished. However, as technologies become more and more advanced, quality demands from users for imaging lens assembly also become higher and higher.

Please refer to FIG. 5A and FIG. 5B, FIG. 5A is a schematic view of a barrel 50 according to the prior art, and FIG. 5B is another schematic view of the barrel 50 according to the prior art of FIG. 5A. As shown in FIGS. 5A and 5B, the barrel portion 51 and the base portion 52 of the barrel 50 according to the prior art are formed integrally, and the arranging space is occupied by the barrel 50 according to the prior art, so that it is not favorable for the minimization of the imaging lens assembly module. Thus, how to develop an imaging lens assembly module that the demands for miniaturizing and imaging quality can be achieved simultaneously has become an important and urgent problem in the industry.

SUMMARY

According to one aspect of the present disclosure, an imaging lens assembly module includes a baseplate and an imaging lens assembly. The baseplate includes an image sensor. The imaging lens assembly is passed through by an optical axis and includes an imaging lens set and a barrel. The imaging lens set includes at least one lens element. The at least one lens element includes two first trimmed surfaces, wherein the first trimmed surfaces are disposed symmetrically along the optical axis, and the first trimmed surfaces are trimmed from an outer annular surface of the at least one lens element to a direction close to the optical axis, so that a contour of the at least one lens element is non-circular along the optical axis. The barrel includes a barrel portion and a base portion. The barrel portion has a first inner surface, wherein a first inner space is defined by the first inner surface, the imaging lens set is disposed in the first inner space, and the barrel portion includes two second trimmed surfaces. The two second trimmed surfaces are disposed symmetrically along the optical axis, wherein the second trimmed surfaces are disposed on the first inner surface corresponding to the first trimmed surfaces, and the second trimmed surfaces are trimmed from the first inner surface to the direction close to the optical axis, so that a contour of the first inner surface is non-circular along the optical axis. The base portion has a second inner surface, wherein a second inner space is defined by the second inner surface, and the base portion extends from the barrel portion along the optical axis and substantially contacts the baseplate, so that a fixed distance is maintained between the barrel portion and an image surface. The barrel portion and the base portion are formed integrally, a shortest distance is defined between the first trimmed surfaces of the at least one lens element, a shortest distance is defined between the second trimmed surfaces of the barrel portion, and the optical axis passes vertically through the shortest distance between the first trimmed surfaces and the shortest distance between the second trimmed surfaces. When the shortest distance between the first trimmed surfaces is L1, the shortest distance between the second trimmed surfaces is L2, and a diameter of the at least one lens element is $\varphi$, the following condition is satisfied: $L1 \leq L2 < \varphi$.

According to another aspect of the present disclosure, an electronic device includes a panel screen and the imaging lens assembly module according to the aforementioned aspect, wherein the imaging lens assembly module is disposed close to the panel screen peripherally. Wherein a screen to body ratio of the panel screen to the electronic device is at least 92%.

BRIEF DESCRIPTION OF THE DRAWINGS

The present disclosure can be more fully understood by reading the following detailed description of the embodiment, with reference made to the accompanying drawings as follows:

FIG. 10 is a cross-sectional view of the imaging lens assembly module according to the 1st embodiment of FIG. 1B along line 10-10.

DETAILED DESCRIPTION

Figure 1A:
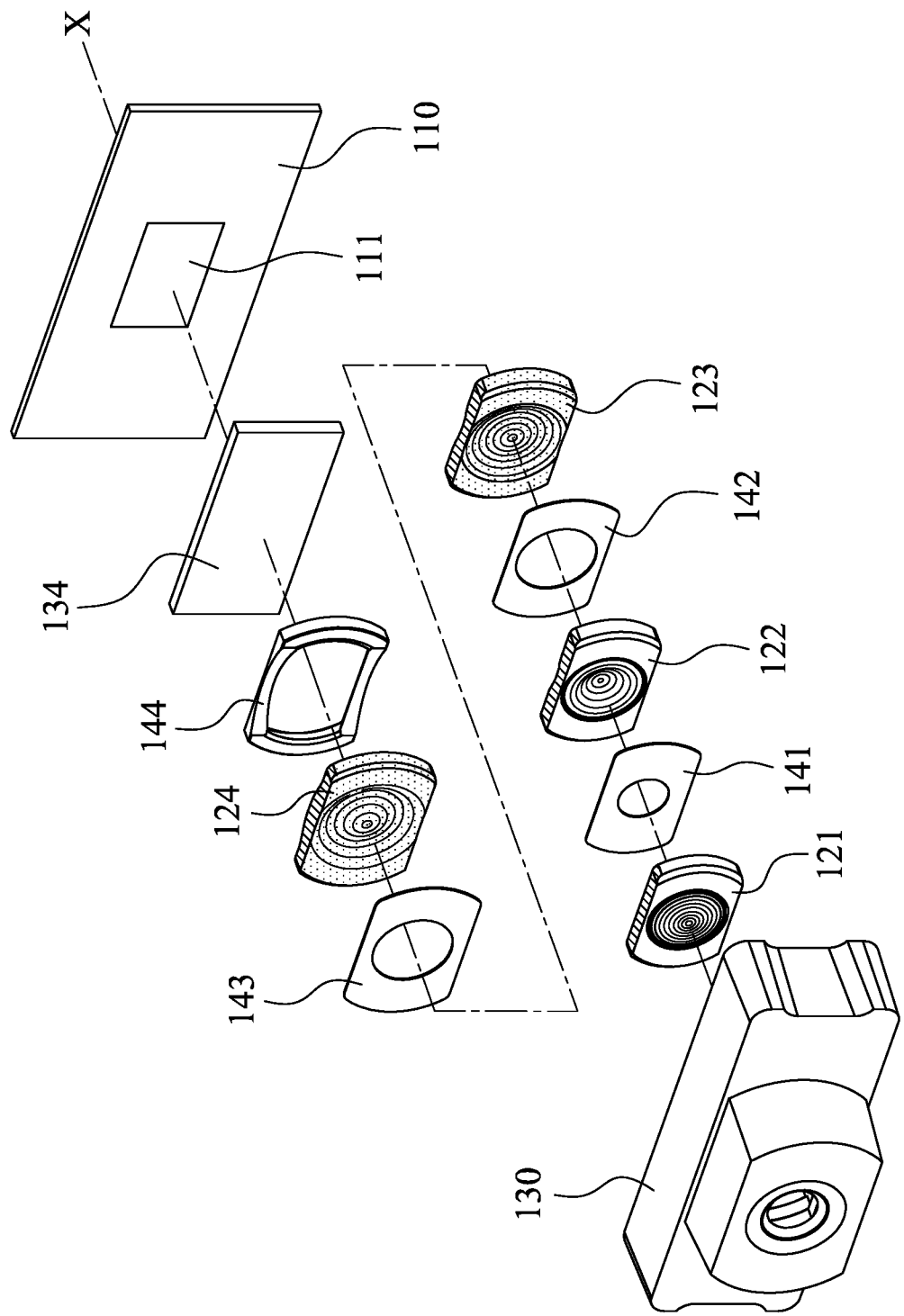
FIG. 1A is an exploded view of an imaging lens assembly module according to the 1st embodiment of the present disclosure.

The present disclosure provides an imaging lens assembly module including a baseplate and an imaging lens assembly. The baseplate includes an image sensor. An optical axis passes through the imaging lens assembly, and the imaging lens assembly includes an imaging lens set and a barrel. The imaging lens set includes at least one lens element, and the lens element includes two first trimmed surfaces, wherein the first trimmed surfaces are disposed symmetrically along the optical axis, and the first trimmed surfaces are trimmed from an outer annular surface of the lens element to a direction close to the optical axis, so that a contour of the at least one lens element is non-circular along the optical axis. The barrel includes a barrel portion and a base portion. The barrel portion has a first inner surface, a first inner space is defined by the first inner surface, the imaging lens set is disposed in the first inner space, and the barrel portion includes two second trimmed surfaces, wherein the second trimmed surfaces are disposed symmetrically along the optical axis, the second trimmed surfaces are disposed on the first inner surface corresponding to the first trimmed surfaces, and the second trimmed surfaces are trimmed from the first inner surface to the direction close to the optical axis, so that a contour of the first inner surface is non-circular along the optical axis. The base portion has a second inner surface, a second inner space is defined by the second inner surface, and the base portion extends from the barrel portion along the optical axis and substantially contacts the baseplate, so that a fixed distance is maintained between the barrel portion and an image surface. The barrel portion and the base portion of the barrel are formed integrally, a shortest distance is defined between the first trimmed surfaces of the lens element, a shortest distance is defined between the second trimmed surfaces of the barrel portion, and the optical axis passes vertically through the shortest distance between the first trimmed surfaces and the shortest distance between the second trimmed surfaces. When the shortest distance between the first trimmed surfaces is L1, the shortest distance between the second trimmed surfaces is L2, and a diameter of the at least one lens element is φ, the following condition is satisfied: L1≤L2<φ.

By the arrangement that the barrel portion and the base portion are formed integrally, it is favorable for simplifying the assembly procedure of the imaging lens assembly module, so that the production efficiency thereof can be improved, and the skew errors between the conventional imaging lens assembly and the base portion during the assembly thereof can be avoided. In particular, the barrel can be a non-threaded structure, and a bottom surface of the base portion can be fixedly connected to the baseplate directly.

Furthermore, by the arrangement of the first trimmed surfaces of the lens element and the second trimmed surfaces of the barrel portion, it is favorable for reducing the size along the direction perpendicular to the optical axis of the imaging lens assembly module, and the miniaturization demands of the imaging lens assembly module can be achieved. In other words, the imaging lens assembly module can still be assembled in a limited space. Moreover, the first trimmed surfaces and the second trimmed surfaces can be planes, curved surfaces, or the combination thereof.

The imaging lens assembly module can be the imaging lens assembly module of the notebook computers or the imaging lens assembly module of the portable electronic devices, but the present disclosure is not limited thereof.

The base portion can include two third trimmed surfaces, wherein the third trimmed surfaces are disposed symmetrically along the optical axis, the third trimmed surfaces are disposed on the second inner surface, and the third trimmed surfaces are trimmed from the second inner surface to the direction close to the optical axis, so that a contour of the base portion is non-circular along the optical axis. Therefore, the size of the barrel can be further compressed along the direction perpendicular to the optical axis, and thus the space needed for the assembly of the baseplate can be reduced. In particular, the third trimmed surfaces can be planes, curved surfaces, or the combination thereof.

The base portion can further include a matting layer, wherein the matting layer is disposed on the second inner surface. Therefore, it is favorable for preventing the reflection of the non-imaging lights generated inside the base portion from affecting the image quality. In particular, the matting layer can be an anti-reflect structure or can be formed by sand blasting process or coating process, but the present disclosure is not limited thereto.

The base portion can include an IR filter, wherein the IR filter is disposed in the second inner space. Therefore, it is favorable for filtering the infrared light and enhancing the image quality.

The base portion can include a vent, wherein the vent communicates the second inner space and an external space of the barrel, the vent extends along a direction parallel to the optical axis, and the vent is reduced gradually from the barrel portion to the base portion. By the arrangement that the vent communicates the second inner space and the external space of the barrel, the air pressure there between can be balanced, so that the shift of the imaging lens assembly module caused by the internal air pressure during the assembly process of the imaging lens assembly module can be avoided.

A number of the lens elements of the imaging lens set can be plural, wherein one of the lens elements closest to an image side includes the first trimmed surfaces. Therefore, it is favorable for achieving the miniaturization of the imaging lens assembly module. In particular, the first trimmed surfaces are disposed starting from the lens element having the largest diameter.

The barrel can further include two fourth trimmed surfaces, wherein the fourth trimmed surfaces are disposed symmetrically along the optical axis, the fourth trimmed surfaces are disposed on an outer surface of the barrel, the fourth trimmed surfaces are trimmed from the outer surface of the barrel to the direction close to the optical axis, and the fourth trimmed surfaces extend along the optical axis from the barrel portion to the base portion, so that a contour of the barrel is non-circular along the optical axis. In particular, the fourth trimmed surfaces can be planes, curved surfaces, or the combination thereof.

At least two of the lens elements adjacent to each other from the lens element closest to the image side to an object side can include the first trimmed surfaces. Therefore, it can be applied to the notebook computer with a narrow bezel, but the present disclosure is not limited thereto.

Each of the lens elements from the object side to the image side can include the first trimmed surfaces. Therefore, it is favorable for further reducing the size of the imaging lens assembly module along the direction perpendicular to the optical axis. In particular, under the condition that all of the lens elements from the object side to the image side include the first trimmed surfaces, the image quality of the imaging lens assembly module can be maintained, and the high production yield can be obtained simultaneously. Furthermore, the imaging lens set can further include light-blocking element and fixing elements, and all of the light-blocking element and the fixing elements include trimmed portions.

The lens element closest to the image side of the lens elements can be connected to the barrel by an adhesive dispensing process. Therefore, it is favorable for enhancing the production efficiency by the arrangement that the lens element is fixed by the adhesive dispensing process, and the assembling stability thereof can be also enhanced. In particular, the adhesive used in the adhesive dispensing process can be a black glue so as to reduce the reflectivity of the non-imaging lights. Furthermore, adhesive dispensing structures can be disposed on an inner surface of the barrel, and the glue filling condition thereof can be assessed through an image recognition method.

The imaging lens assembly module can further include a light path turning element, wherein the light path turning element is for guiding a light to the imaging lens assembly. In detail, the light path turning element can be a prism or a reflecting mirror and can be disposed between the imaging lens assembly and the light entrance, but the present disclosure is not limited thereto.

When a height of the base portion of the barrel along the optical axis is H1, and a height of the barrel as entire along the optical axis is H, the following condition can be satisfied: $0.13<H1/H<0.84$. By adjusting the height of the base portion, it is favorable for responding the various assembly or optical needs.

When the shortest distance between the first trimmed surfaces is L1, and the diameter of the lens element is φ, the following condition can be satisfied: $0.5<L1/\varphi<0.8$. Therefore, it is favorable for miniaturizing the imaging lens assembly and maintaining the optical properties thereof.

A first shortest width is defined between the fourth trimmed surfaces of the barrel closest to the image side, and the optical axis passes vertically through the first shortest width. When the first shortest width is W1, the following condition can be satisfied: $0.8\ mm<W1<2.2\ mm$. Therefore, the imaging lens assembly can be assembled in the limited space of the baseplate.

A second shortest width is defined between the fourth trimmed surfaces of the barrel closest to an object side, the optical axis passes vertically through the first shortest width and the second shortest width, and there is a width difference between the first shortest width and the second shortest width. When the first shortest width is W1, the second shortest width is W2, and the width difference is ΔW, the following conditions can be satisfied: $\Delta W=|W1-W2|$; and $0.005\ mm<\Delta W/2<0.2\ mm$. By the arrangement that there is without extreme height differences on the outer surface of the barrel, the assembled space thereof can be utilized effectively.

When the first shortest width is W1, and the second shortest width is W2, the following condition can be satisfied: $0.7\ mm<(W1+W2)/2<2.1\ mm$. Therefore, the imaging lens assembly module can be assembled in a limited space. In detail, both the widths of the object side and the image side of the barrel are small in size.

The lens elements can respectively include an edge portion and an optical effective portion, wherein the edge portion is farther away from the optical axis than the optical effective portion, the optical effective portion has a refractive power, and a contour of the optical effective portion is non-circular along the optical axis due to the first trimmed surfaces. When the shortest distance between the first trimmed surfaces is L1, and a diameter of the optical effective portion of each of the lens element is φeff, the following condition can be satisfied: $L1<\varphi eff$. Simultaneously, a projected area of the optical effective portion along the optical axis is larger than a projected area of the image sensor, so that the image quality of the imaging lens assembly can be maintained after miniaturized.

The first trimmed surfaces and the second trimmed surfaces can be arranged air-gapped. When the shortest distance between the first trimmed surfaces is L1, and the shortest distance between the second trimmed surfaces is L2, the following condition can be satisfied: $L1<L2$. Therefore, the assembly errors caused by over-constrained of the lens elements can be avoided.

Each of the aforementioned features of the imaging lens assembly module of the present disclosure can be utilized in numerous combinations, so as to achieve the corresponding functionality.

The present disclosure provides an electronic device including a panel screen and the aforementioned imaging lens assembly module, wherein the imaging lens assembly module is disposed close to the panel screen peripherally, and a screen to body ratio of the panel screen to the electronic device is at least 92%.

Furthermore, the screen to body ratio of the panel screen to the electronic device can be at least 95%, and the electronic device can be a notebook computer.

According to the above descriptions, the specific embodiments and reference drawings thereof are given below so as to describe the present disclosure in detail.

1st Embodiment

Figure 1B:
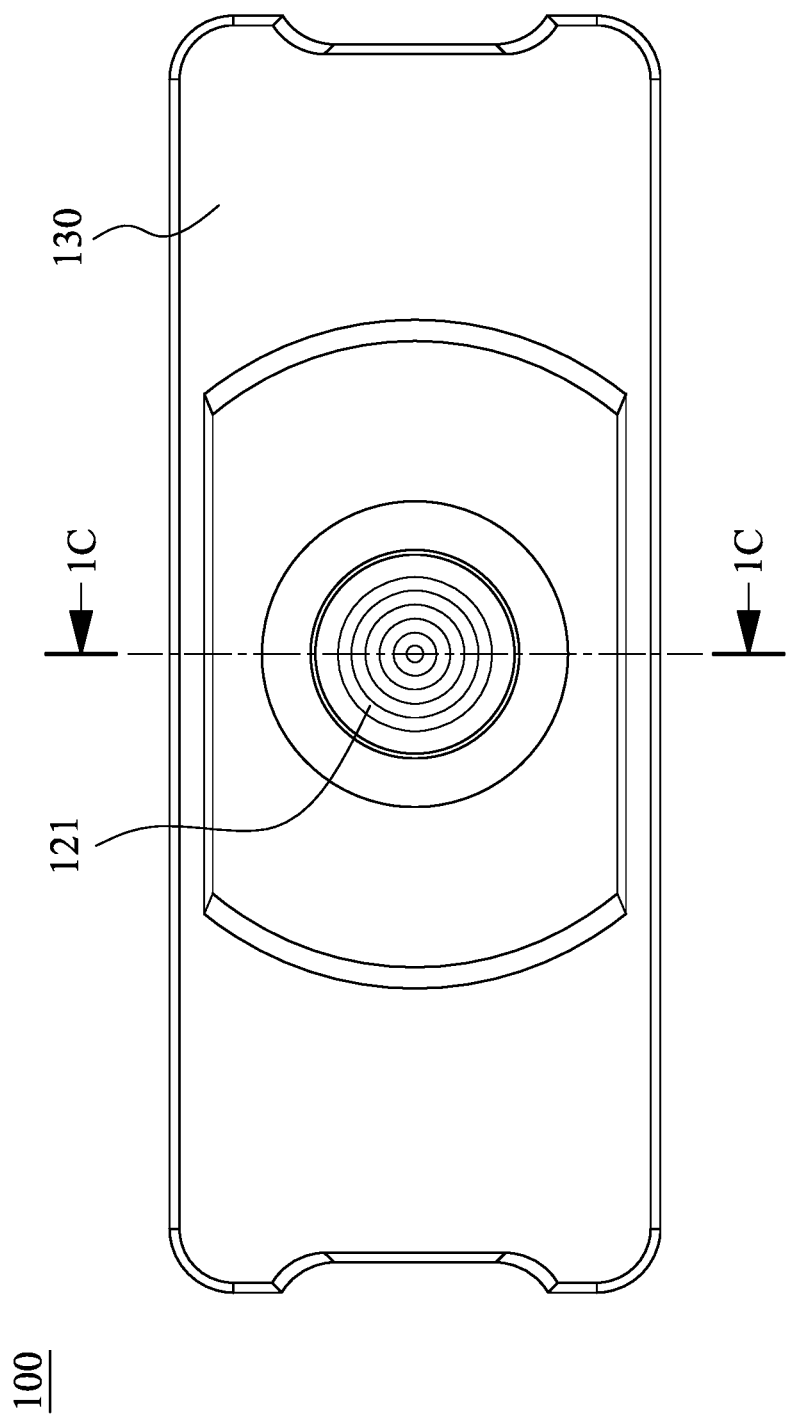
FIG. 1B is a schematic view of the imaging lens assembly module according to the 1st embodiment of FIG. 1A.
Figure 1C:
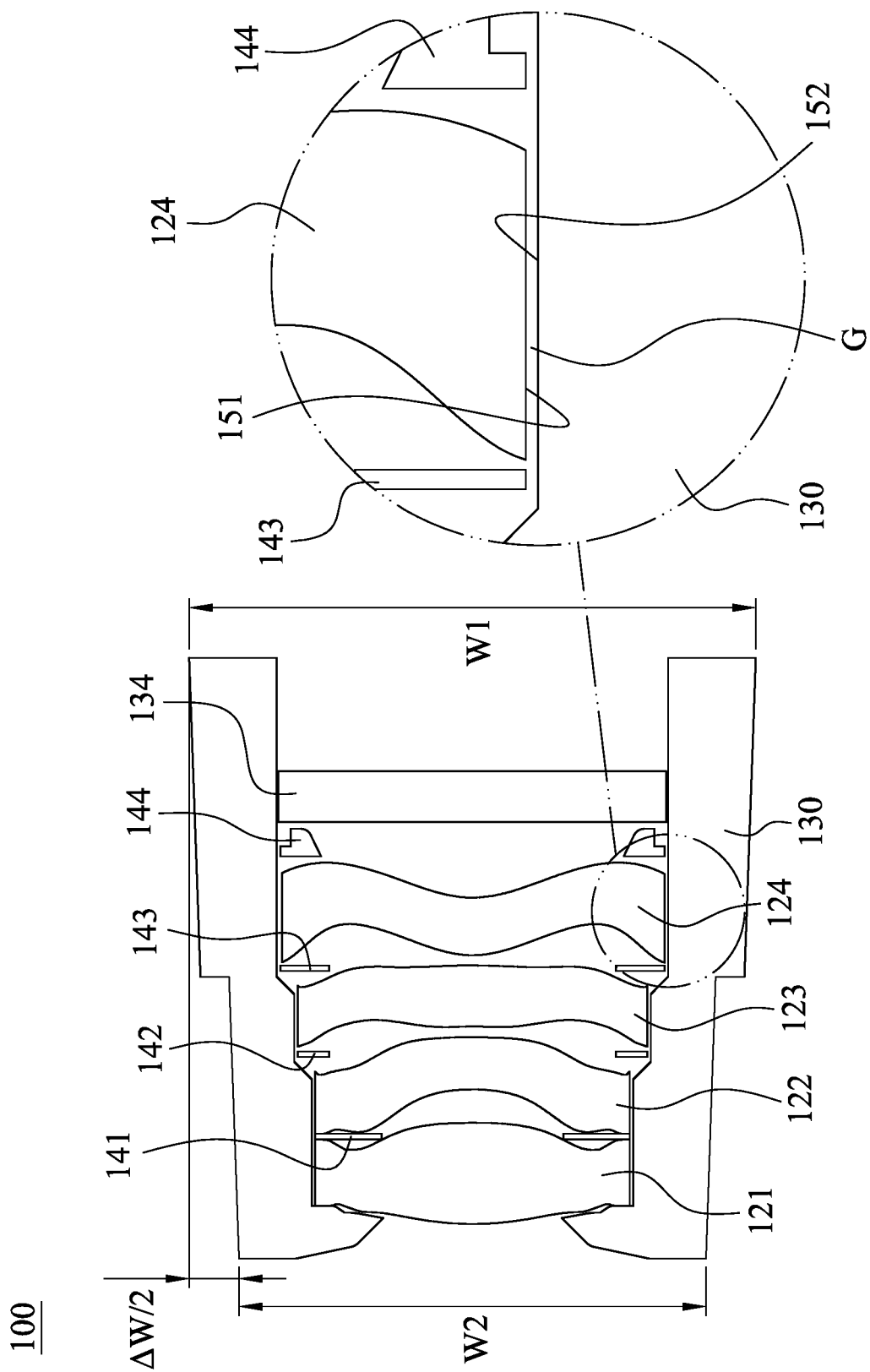
FIG. 1D is a schematic view from an image side of the imaging lens assembly module according to the 1st embodiment of FIG. 1A.
FIG. 1E is a side schematic view of a lens element according to the 1st embodiment of FIG. 1A.
FIG. 1F is a schematic view of the lens element according to the 1st embodiment of FIG. 1A.
FIG. 1G is a schematic view of parameters of a barrel according to the 1st embodiment of FIG. 1A.
FIG. 1H is a three-dimensional schematic view of the barrel according to the 1st embodiment of FIG. 1A.
FIG. 1I is another three-dimensional schematic view of the barrel according to the 1st embodiment of FIG. 1A.
FIG. 1J is a cross-sectional view of the barrel according to the 1st embodiment of FIG. 1A.
Figure 1D:
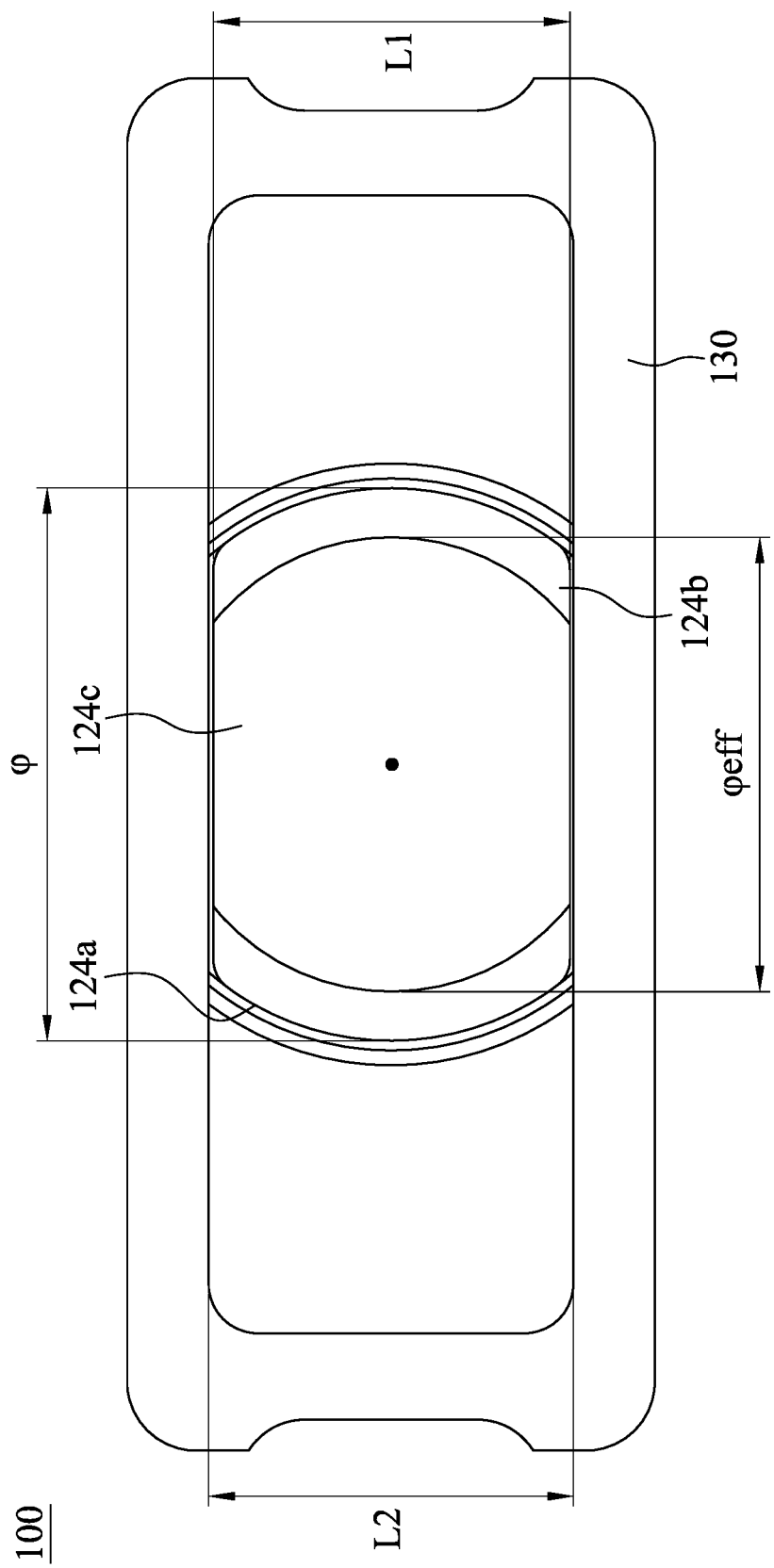

FIG. 1A is an exploded view of an imaging lens assembly module 100 according to the 1st embodiment of the present disclosure, FIG. 1B is a schematic view of the imaging lens assembly module 100 according to the 1st embodiment of FIG. 1A, FIG. 1O is a cross-sectional view of the imaging lens assembly module 100 according to the 1st embodiment of FIG. 1B along line 1C-1C, and FIG. 1D is a schematic view from an image side of the imaging lens assembly module according to the 1st embodiment of FIG. 1A. As shown in FIG. 1A to FIG. 1D, the imaging lens assembly module 100 includes a baseplate 110 and an imaging lens assembly (reference number is omitted), wherein the baseplate 110 includes an image sensor 111, the imaging lens assembly is passed through by an optical axis X, and the imaging lens assembly includes an imaging lens set (reference number is omitted) and a barrel 130. In particular, the imaging lens assembly module 100 can be an imaging lens assembly module of a notebook computer or an imaging lens assembly module of a portable device, but the present disclosure is not limited thereto.

The imaging lens set includes at least one lens element, wherein a number of the lens elements of the imaging lens set can be plural, and the imaging lens set can further include a light-blocking element and a fixing element. In the 1st embodiment, the imaging lens set includes, in order from an object side to the image side, a lens element 121, a light-blocking element 141, a lens element 122, a light-blocking element 142, a lens element 123, a light-blocking element 143, a lens element 124 and a fixing element 144. It must be noted that the number of the lens elements and the optical elements, structures, surface shapes and other optical characteristics can be arranged according to actual image requirements, and the present disclosure is not limited thereto.

Figure 1F:
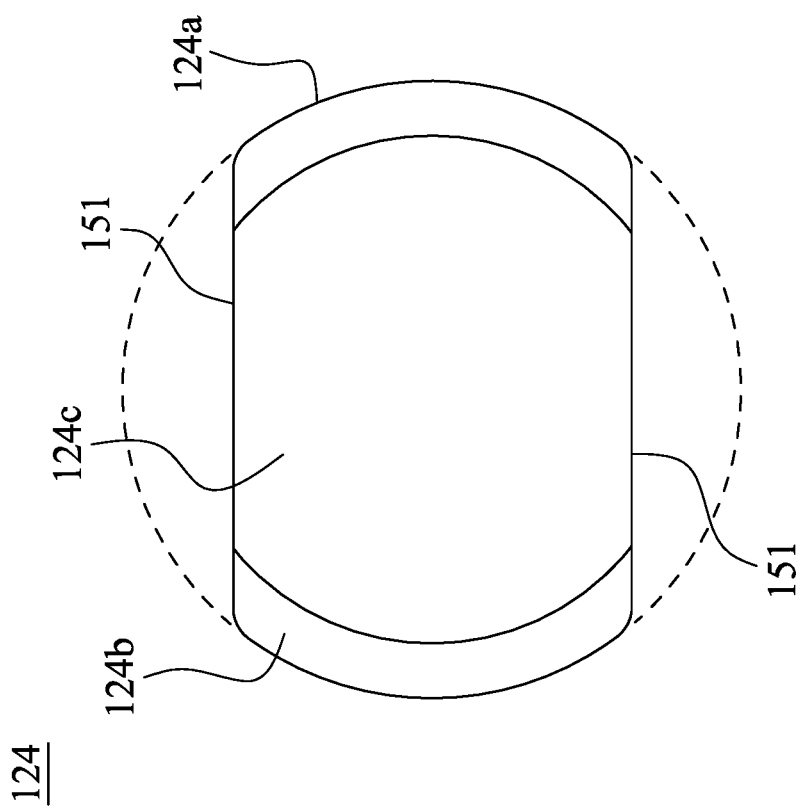
Figure 1E:
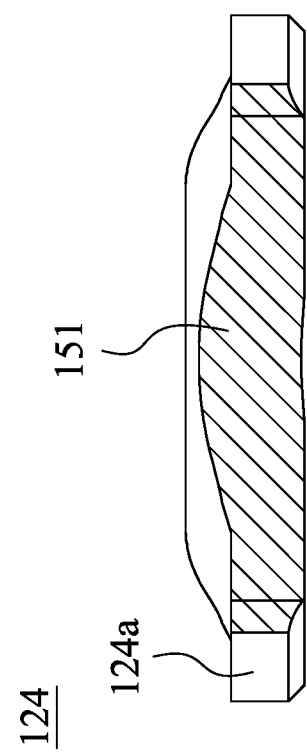

Please refer to FIG. 1E and FIG. 1F, wherein FIG. 1E is a side schematic view of the lens element 124 according to the 1st embodiment of FIG. 1A, and FIG. 1F is a schematic view of the lens element 124 according to the 1st embodiment of FIG. 1A. As shown in FIG. 1D to FIG. 1F, the lens element 124 includes two first trimmed surfaces 151, wherein the first trimmed surfaces 151 are disposed symmetrically along the optical axis X, and the first trimmed surfaces 151 are trimmed from an outer annular surface 124a of the lens element 124 to a direction close to the optical axis X, so that a contour of the lens element 124 is non-circular along the optical axis X. In the 1st embodiment, the first trimmed surfaces 151 can be planes.

Figure 1G:
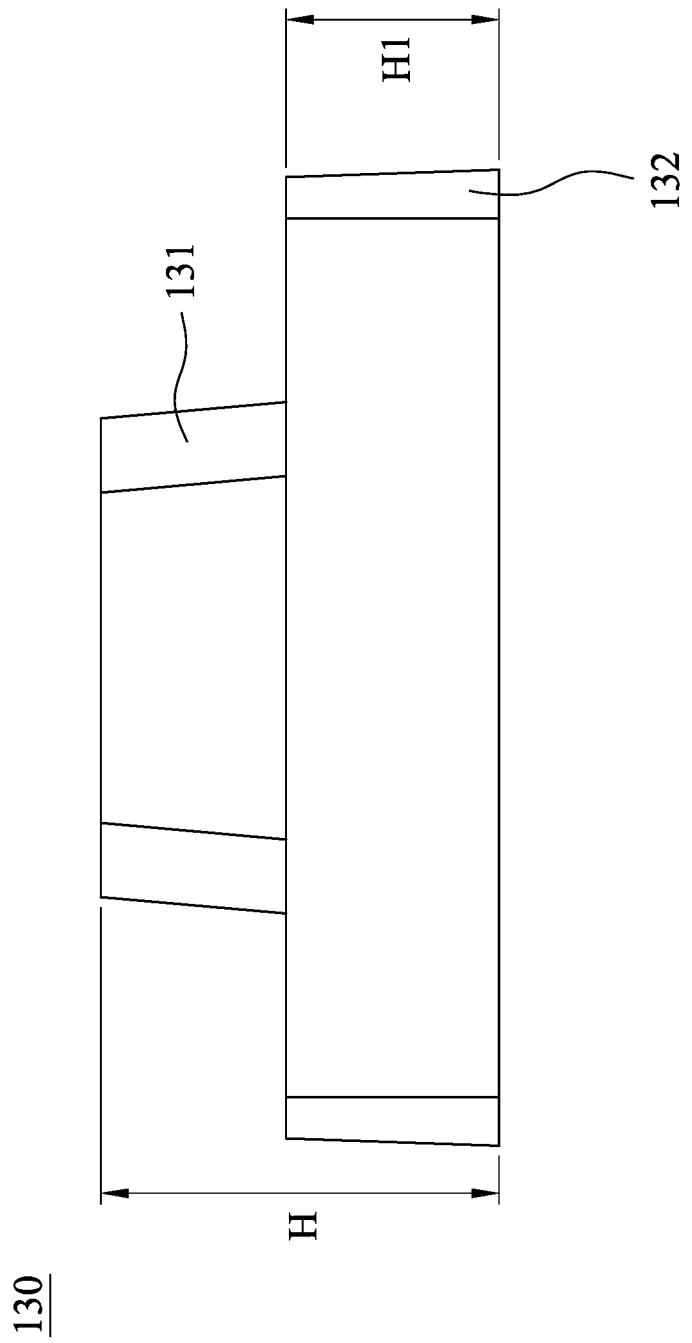
Figure 1I:
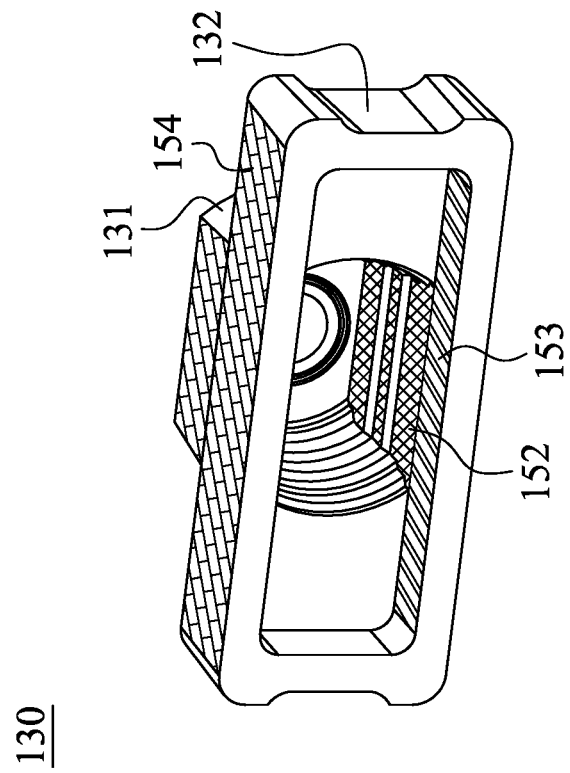
Figure 1H:
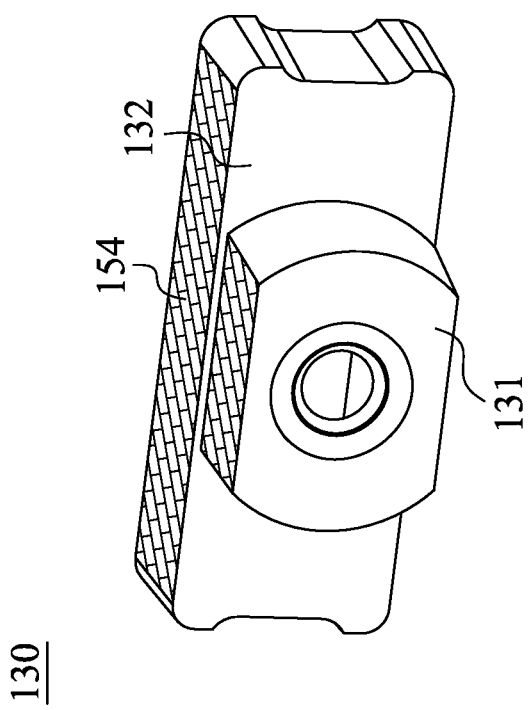
Figure 1J:
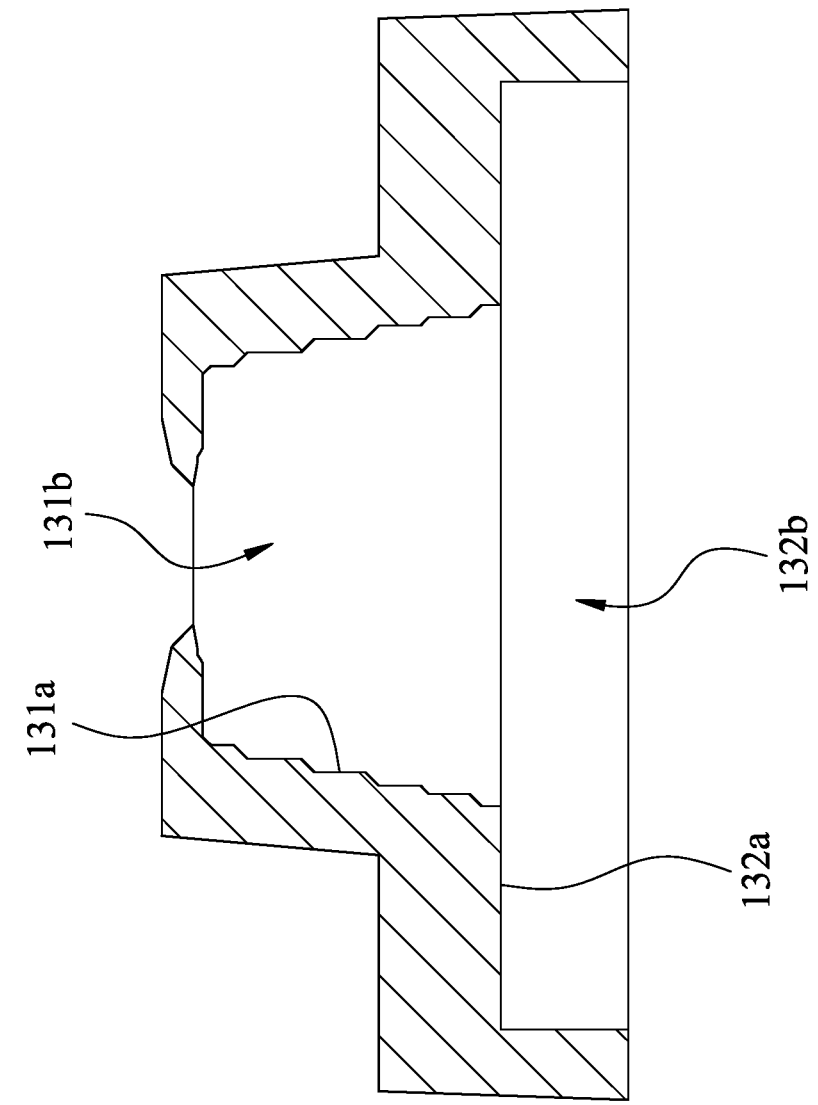

Please refer to FIG. 1G to FIG. 1J, wherein FIG. 1G is a schematic view of parameters of the barrel 130 according to the 1st embodiment of FIG. 1A, FIG. 1H is a three-dimensional schematic view of the barrel 130 according to the 1st embodiment of FIG. 1A, FIG. 1I is another three-dimensional schematic view of the barrel 130 according to the 1st embodiment of FIG. 1A, and FIG. 1J is a cross-sectional view of the barrel 130 according to the 1st embodiment of FIG. 1A. As shown in FIG. 1G to FIG. 1J, the barrel 130 includes a barrel portion 131 and a base portion 132, wherein the barrel portion 131 has a first inner surface 131a, a first inner space 131b is defined by the first inner surface 131a, and the imaging lens set is disposed in the first inner space 131b. The base portion 132 has a second inner surface 132a, a second inner space 132b is defined by the second inner surface 132a, and the base portion 132 extends from the barrel portion 131 along the optical axis X and substantially contacts the baseplate 110, so that a fixed distance is maintained between the barrel portion 131 and an image surface. In particular, the barrel 130 can be a non-threaded structure, and a bottom surface of the base portion 132 can be fixedly connected to the baseplate 110 directly. Furthermore, the barrel portion 131 and the base portion 132 are formed integrally, so that it is favorable for simplifying the assembly procedure of the imaging lens assembly module 100, the production efficiency thereof can be improved, and the skew errors between the conventional imaging lens assembly and the base portion during the assembly thereof can be avoided.

Furthermore, the barrel portion 131 of the barrel 130 includes two second trimmed surfaces 152, wherein the second trimmed surfaces 152 are disposed symmetrically along the optical axis X. The second trimmed surfaces 152 are disposed on the first inner surface 131a corresponding to the first trimmed surfaces 151, and the second trimmed surfaces 152 are trimmed from the first inner surface 131a to the direction close to the optical axis X, so that a contour of the first inner surface 131a is non-circular along the optical axis X. In the 1st embodiment, the second trimmed surfaces 152 can be planes.

Furthermore, by the arrangement of the first trimmed surfaces 151 of the lens element 124 and the second trimmed surfaces 152 of the barrel portion 131, it is favorable for reducing the size along the direction perpendicular to the optical axis X of the imaging lens assembly module 100, and the miniaturization demands of the imaging lens assembly module 100 can be achieved. In other words, the imaging lens assembly module 100 can still be assembled in a limited space.

As shown in FIG. 1A, the lens element closest to the image side (that is, the lens element 124) of the lens elements 121, 122, 123, 124 includes the first trimmed surfaces 151. Therefore, it is favorable for achieving the miniaturization of the imaging lens assembly module 100. In particular, the first trimmed surfaces 151 are disposed starting from the lens element having the largest diameter.

Furthermore, at least two of the lens elements adjacent to each other from the lens element closest to the image side (that is, the lens element 124) to the object side include the first trimmed surfaces 151 (as the marks shown in the lens element 124). Therefore, it can be applied to the notebook computer with a narrow bezel, but the present disclosure is not limited thereto.

Furthermore, each of the lens elements 121, 122, 123, 124 from the object side to the image side includes the first trimmed surfaces 151 (as the marks shown in the lens element 124), and all of the light-blocking elements 141, 142, 143 and the fixing element 144 include trimmed portions. Therefore, the size of the imaging lens assembly module 100 along the direction perpendicular to the optical axis X can be further reduced. In particular, under the condition that all of the lens element closest to the object side (that is, the lens element 121) to the lens element closest to the image side (that is, the lens element 124) include the first trimmed surfaces 151 (as the marks shown in the lens element 124), the image quality of the imaging lens assembly module 100 can be maintained and the high production yield can be obtained simultaneously.

As shown in FIG. 1O, the first trimmed surfaces 151 and the second trimmed surfaces 152 are arranged air-gapped, and an air space G is disposed between the first trimmed surfaces 151 and the second trimmed surfaces 152. Therefore, the assembly errors caused by over-constrained of the lens elements 121, 122, 123, 124 can be avoided.

As shown in FIG. 1D and FIG. 1F, the lens elements 121, 122, 123, 124 further respectively include an edge portion 124b (as the marks shown in the lens element 124) and an optical effective portion 124c (as the marks shown in the lens element 124), and the edge portion 124b is farther away from the optical axis X than the optical effective portion 124c. The optical effective portion 124c has a refractive power, and a contour of the optical effective portion 124c is non-circular along the optical axis X due to the first trimmed surfaces 151.

The base portion 132 further includes two third trimmed surfaces 153, wherein the third trimmed surfaces 153 are disposed symmetrically along the optical axis X, the third trimmed surfaces 153 are disposed on the second inner surface 132a, and the third trimmed surfaces 153 are trimmed from the second inner surface 132a to the direction close to the optical axis X, so that a contour of the base portion 132 is non-circular along the optical axis X. Therefore, the size of the barrel 130 can be further compressed along the direction perpendicular to the optical axis X, and thus the space needed for the assembly of the baseplate 110 can be reduced. In the 1st embodiment, the third trimmed surfaces 153 can be planes.

The base portion 132 further includes a matting layer disposed on the second inner surface 132a. Therefore, it is favorable for preventing the reflection of the non-imaging lights generated inside the base portion 132 and from affecting the image quality. In particular, the matting layer can be an anti-reflect structure or can be formed by sand blasting process or coating process, but the present disclosure is not limited thereto.

As shown in FIG. 1A and FIG. 10, the base portion 132 includes an IR filter 134, wherein the IR filter 134 is disposed in the second inner space 132b. Therefore, it is favorable for filtering the infrared light and enhancing the image quality.

As shown in FIG. 1H and FIG. 1I, the barrel 130 further includes two fourth trimmed surfaces 154, wherein the fourth trimmed surfaces 154 are disposed symmetrically along the optical axis X, and the fourth trimmed surfaces 154 are disposed on an outer surface of the barrel 130. The fourth trimmed surfaces 154 are trimmed from the outer surface of the barrel 130 to the direction close to the optical axis X, and the fourth trimmed surfaces 154 extend along the optical axis X from the barrel portion 131 to the base portion 132, so that a contour of the barrel 130 is non-circular along the optical axis X. In the 1st embodiment, the fourth trimmed surfaces 154 can be planes. It must be noted that the pattern of each of the trimmed surfaces (those are, the second trimmed surfaces 152, the third trimmed surfaces 153, and the fourth trimmed surfaces 154) is only used to illustrate the area of the trimmed surface and does not form a part of the structure of each of the trimmed surfaces.

The lens element closest to the image side (that is, the lens element 124) of the lens elements is connected to the barrel 130 by an adhesive dispensing process. By the arrangement that the lens element is fixed by the adhesive dispensing process, it is favorable for enhancing the production efficiency thereof, and the assembling stability thereof can be also enhanced. In particular, the adhesive used in the adhesive dispensing process is disposed on the edge portion 124b and is connected to the barrel 130, and the adhesive can be a black glue so as to reduce the reflectivity of the non-imaging lights. Furthermore, adhesive dispensing structures can be disposed on an inner surface of the barrel 130, and the glue filling condition thereof can be assessed through an image recognition method.

As shown in FIG. 10, FIG. 1D and FIG. 1G, a shortest distance is defined between the first trimmed surfaces 151 of the lens element 124, a shortest distance is defined between the second trimmed surfaces 152 of the barrel portion 131, and the optical axis X passes vertically through the shortest distance between the first trimmed surfaces 151 and the shortest distance between the second trimmed surfaces 152.

When the shortest distance between the first trimmed surfaces 151 is L1, the shortest distance between the second trimmed surfaces 152 is L2, a diameter of the lens element 124 is φ, a height of the base portion 132 of the barrel 130 along the optical axis X is H1, a height of the barrel 130 as entire along the optical axis X is H, a first shortest width is defined between the fourth trimmed surfaces 154 of the barrel 130 closest to the image side, a second shortest width is defined between the fourth trimmed surfaces 154 of the barrel 130 closest to the object side, the optical axis X passes vertically through the first shortest width and the second shortest width, there is a width difference between the first shortest width and the second shortest width, the first shortest width is W1, the second shortest width is W2, the width difference is ΔW, and a diameter of the optical effective portion of each of the lens elements 121, 122, 123, 124 (as the marks shown in the optical effective portion 124c of the lens element 124) is φeff, the aforementioned parameters satisfy the conditions shown in Table 1.

TABLE 1

| 1st Embodiment | | | |
|---|---|---|---|
| L1 (mm) | 1.1 | ΔW | 0.28 |
| L2 (mm) | 1.12 | φeff (mm) | 1.4 |
| φ (mm) | 1.7 | H1/H | 0.53 |
| H1 (mm) | 0.92 | L1/φ | 0.65 |
| H (mm) | 1.72 | ΔW/2 | 0.14 |
| W1 (mm) | 1.62 | (W1 + W2)/2 | 1.48 |
| W2 (mm) | 1.34 | | |

In the 1st embodiment, the shortest distance between the first trimmed surfaces 151 and the diameter of the optical effective portion of each of the lens elements 123, 124 (as the marks shown in the optical effective portion 124c of the lens element 124) satisfy the following condition: L1<φeff.

2nd Embodiment

Figure 2A:
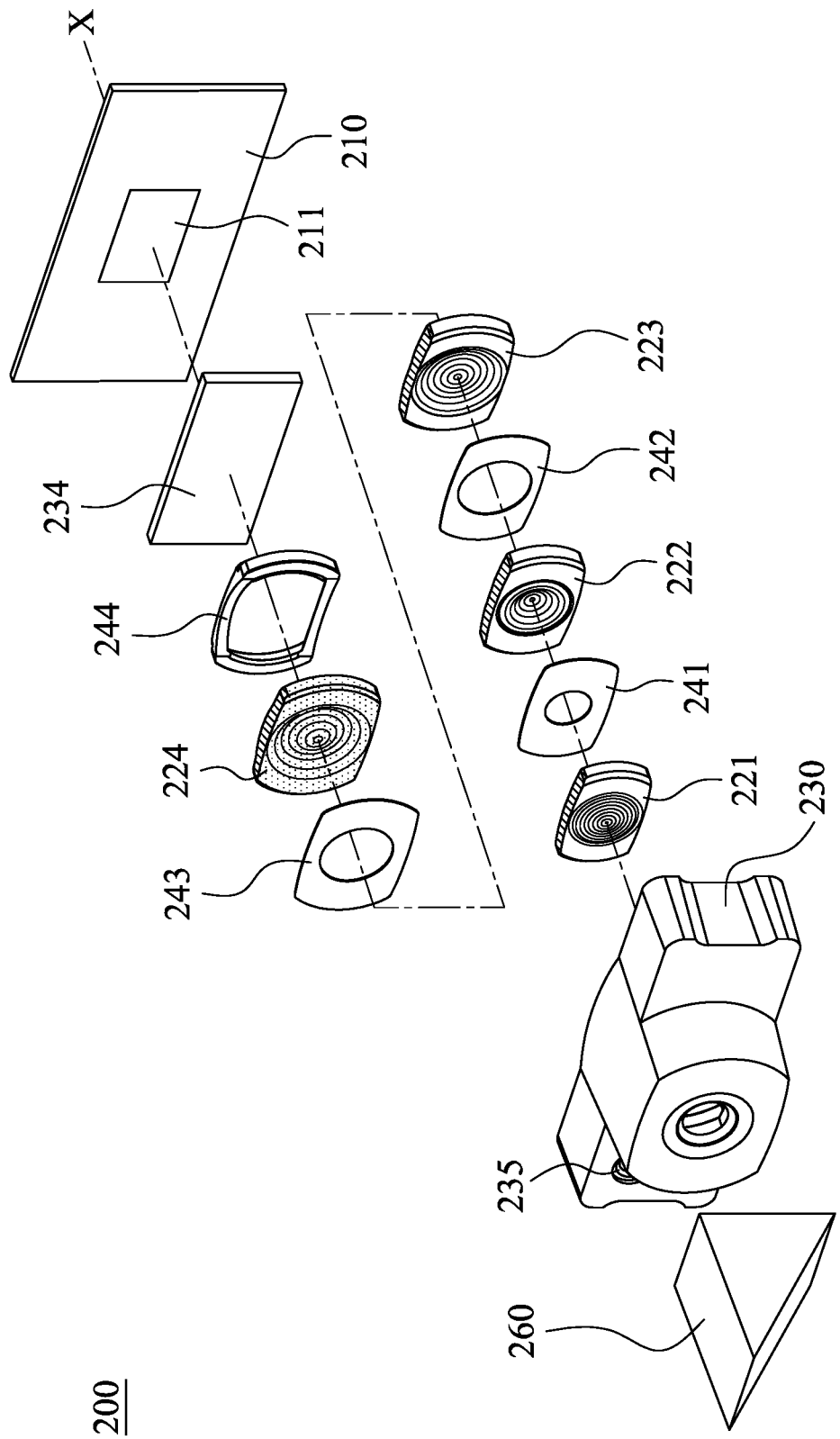
FIG. 2A is an exploded view of an imaging lens assembly module according to the 2nd embodiment of the present disclosure.
Figure 2B:
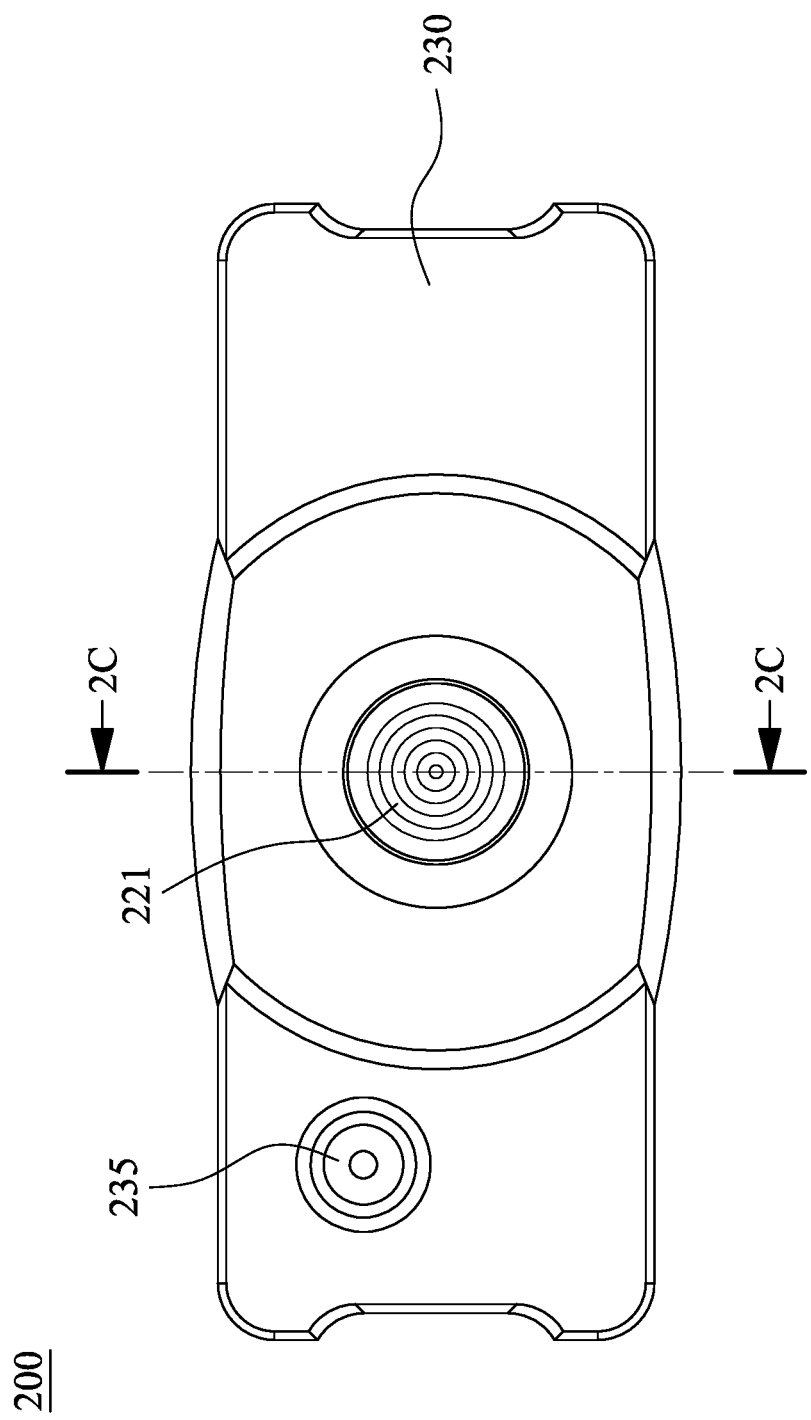
FIG. 2B is a schematic view of the imaging lens assembly module according to the 2nd embodiment of FIG. 2A.
Figure 2C:
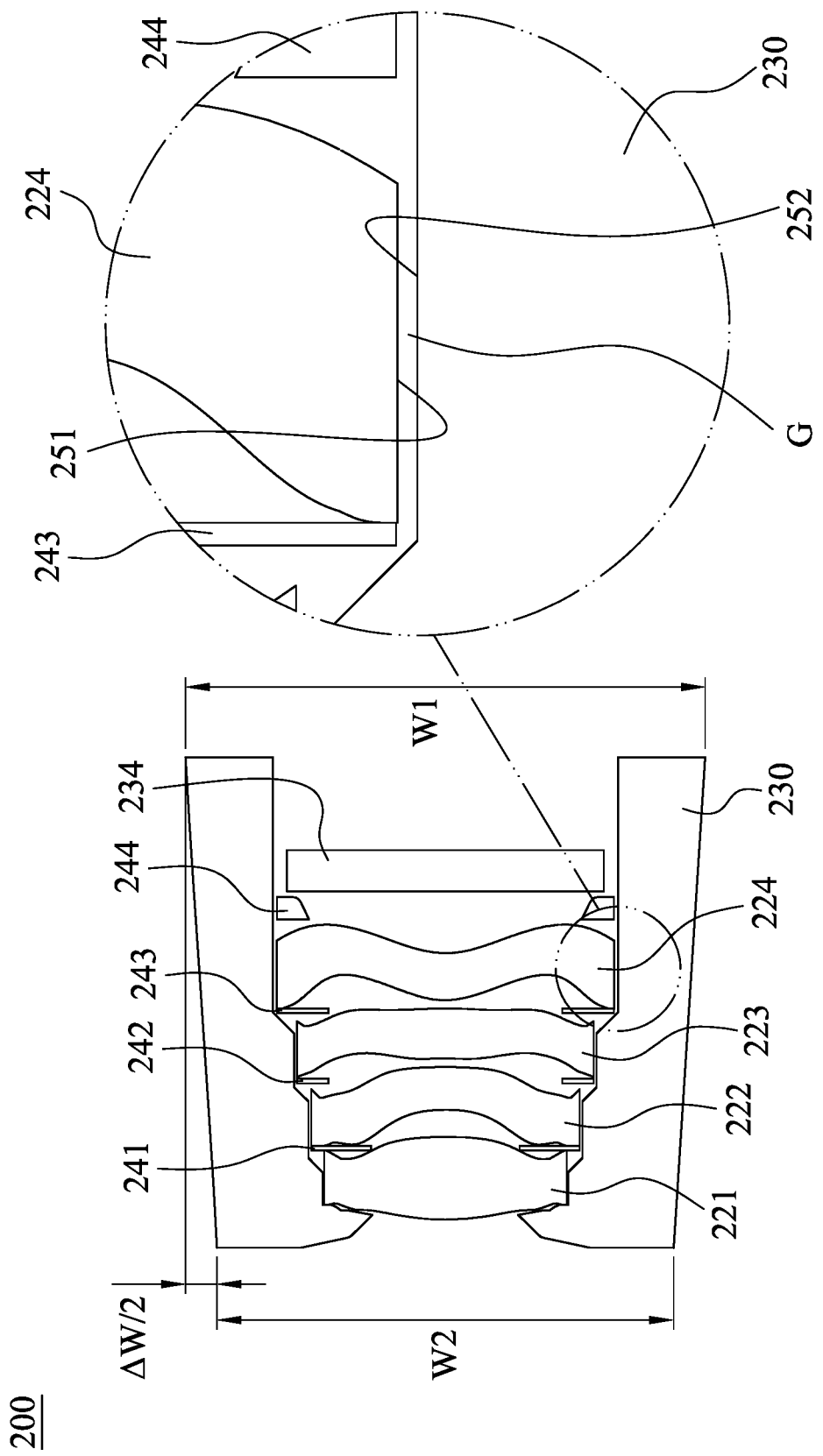
FIG. 2C is a cross-sectional view of the imaging lens assembly module according to the 2nd embodiment of FIG. 2B along line 2C-2C.
Figure 2D:
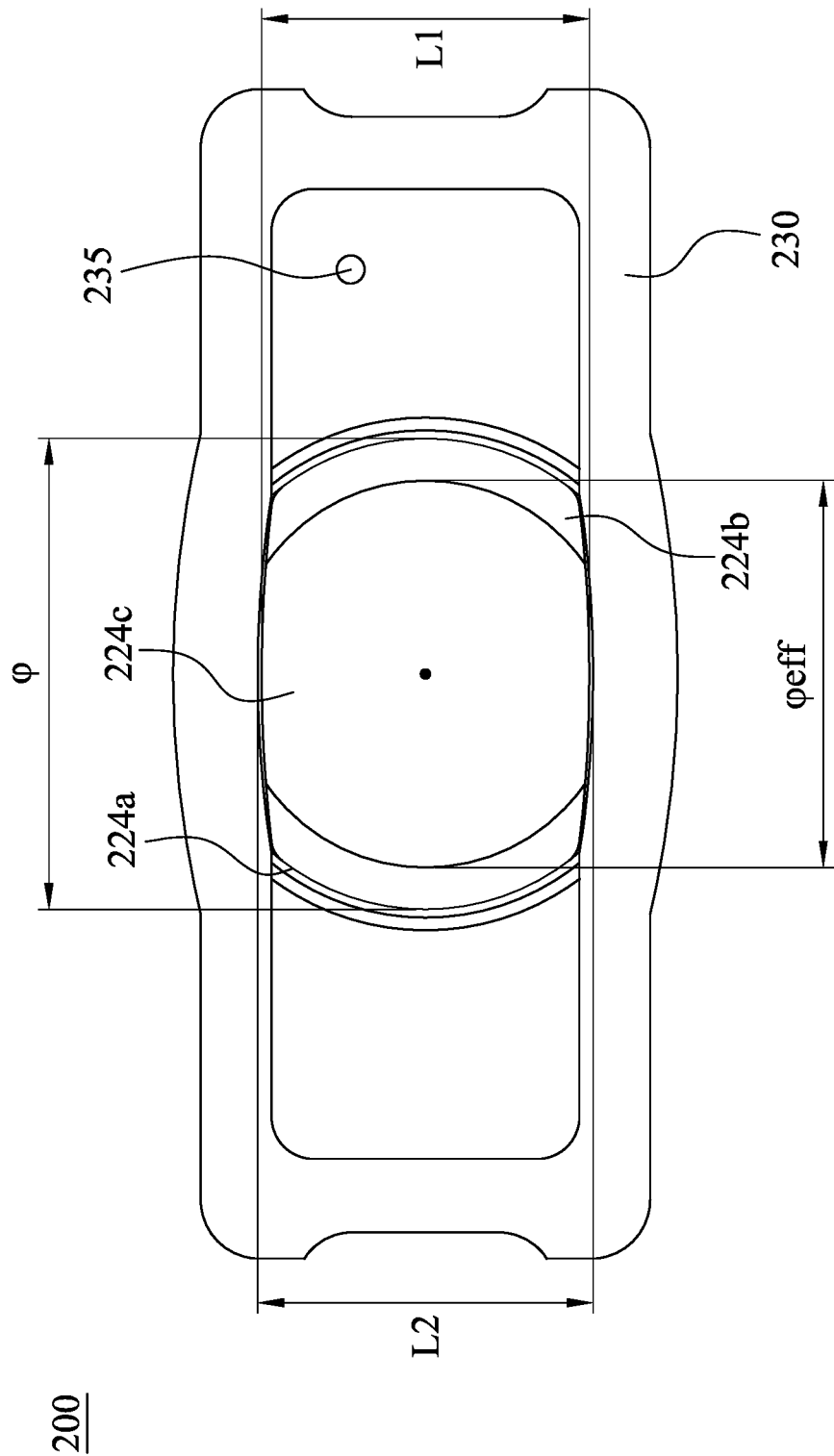
FIG. 2D is a schematic view from an image side of the imaging lens assembly module according to the 2nd embodiment of FIG. 2A.

FIG. 2A is an exploded view of an imaging lens assembly module 200 according to the 2nd embodiment of the present disclosure, FIG. 2B is a schematic view of the imaging lens assembly module 200 according to the 2nd embodiment of FIG. 2A, FIG. 2C is a cross-sectional view of the imaging lens assembly module 200 according to the 2nd embodiment of FIG. 2B along line 2C-2C, and FIG. 2D is a schematic view from an image side of the imaging lens assembly module 200 according to the 2nd embodiment of FIG. 2A. As shown in FIG. 2A to FIG. 2D, the imaging lens assembly module 200 includes a baseplate 210 and an imaging lens assembly (reference number is omitted), wherein the baseplate 210 includes an image sensor 211, the imaging lens assembly is passed through by an optical axis X, and the imaging lens assembly includes an imaging lens set (reference number is omitted) and a barrel 230. In particular, the imaging lens assembly module 200 can be an imaging lens assembly module of a notebook computer or an imaging lens assembly module of a portable device, but the present disclosure is not limited thereto.

The imaging lens set includes at least one lens element, wherein a number of the lens elements of the imaging lens set can be plural, and the imaging lens set can further include a light-blocking element and a fixing element. In the 2nd embodiment, the imaging lens set includes, in order from an object side to the image side, a lens element 221, a light-blocking element 241, a lens element 222, a light-blocking element 242, a lens element 223, a light-blocking element 243, a lens element 224 and a fixing element 244. It must be noted that the number of the lens elements and the optical elements, structures, surface shapes and other optical characteristics can be arranged according to actual image requirements, and the present disclosure is not limited thereto.

Figure 2F:
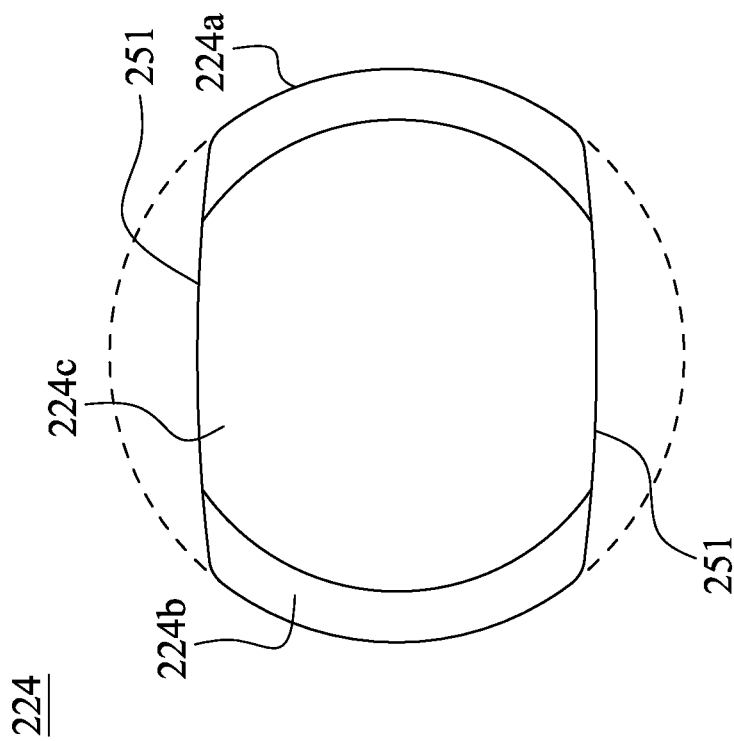
FIG. 2F is a schematic view of the lens element according to the 2nd embodiment of FIG. 2A.
Figure 2E:
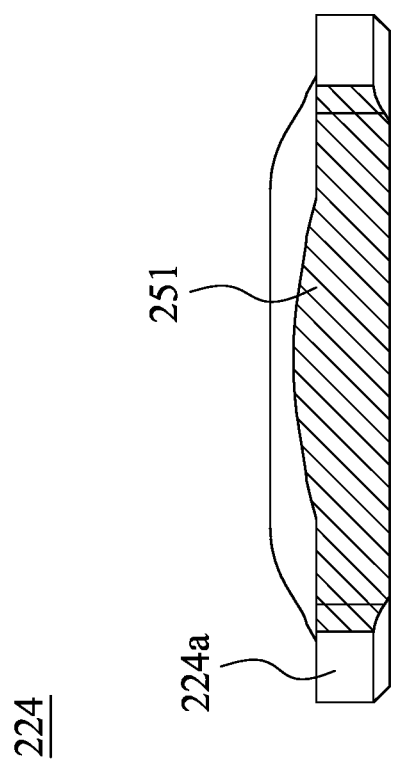
FIG. 2E is a side schematic view of a lens element according to the 2nd embodiment of FIG. 2A.

Please refer to FIG. 2E and FIG. 2F, wherein FIG. 2E is a side schematic view of a lens element 224 according to the 2nd embodiment of FIG. 2A, and FIG. 2F is a schematic view of the lens element 224 according to the 2nd embodiment of FIG. 2A. As shown in FIG. 2D to FIG. 2F, the lens element 224 includes two first trimmed surfaces 251, wherein the first trimmed surfaces 251 are disposed symmetrically along the optical axis X, and the first trimmed surfaces 251 are trimmed from an outer annular surface 224a of the lens element 224 to a direction close to the optical axis X, so that a contour of the lens element 224 is non-circular along the optical axis X. In the 2nd embodiment, the first trimmed surfaces 251 can be curved surfaces.

Figure 2G:
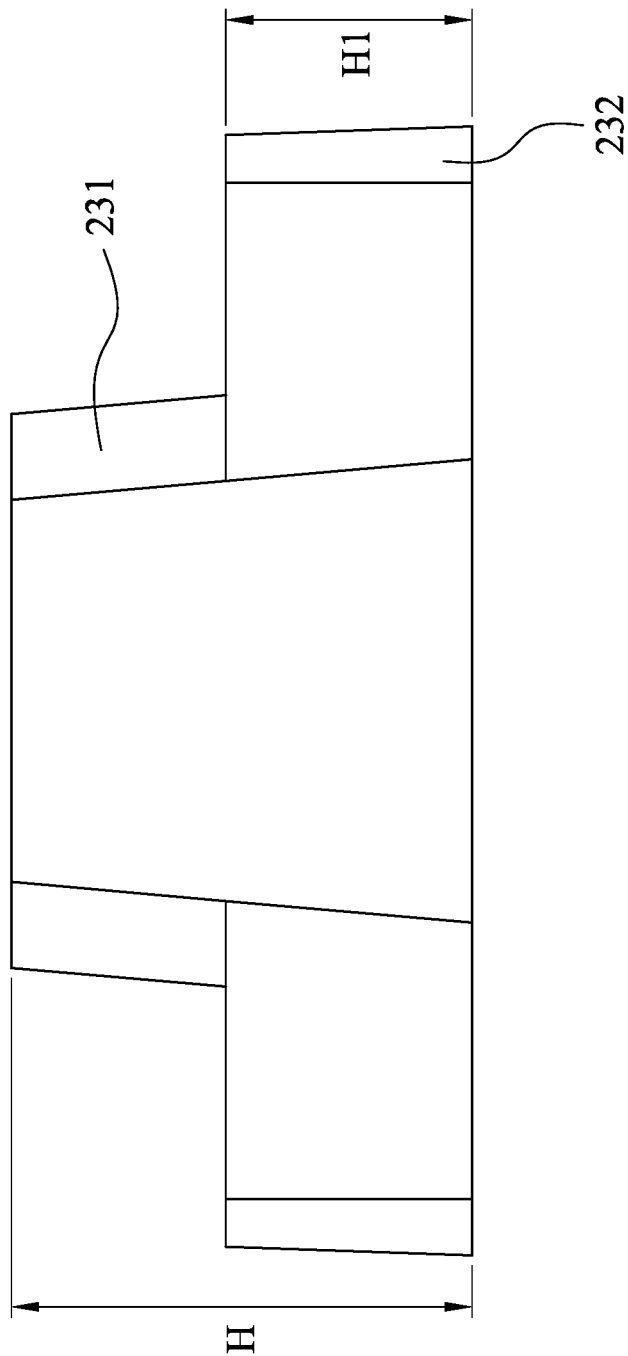
FIG. 2G is a schematic view of parameters of a barrel according to the 2nd embodiment of FIG. 2A.
Figure 2I:
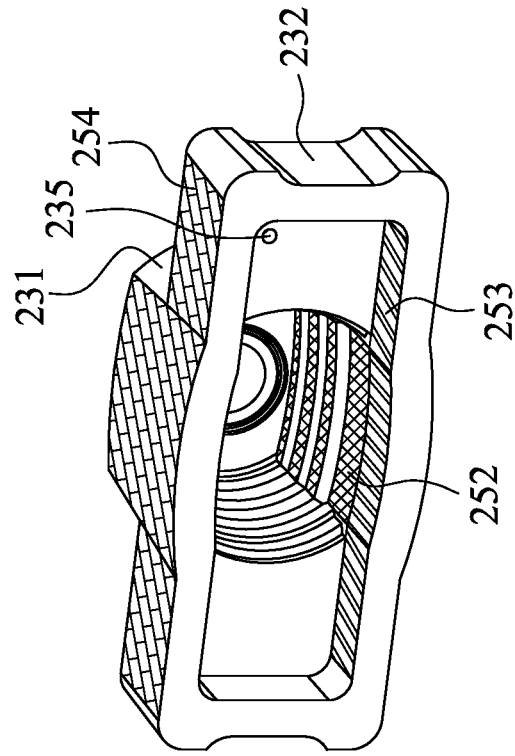
FIG. 2I is another three-dimensional schematic view of the barrel according to the 2nd embodiment of FIG. 2A.
Figure 2H:
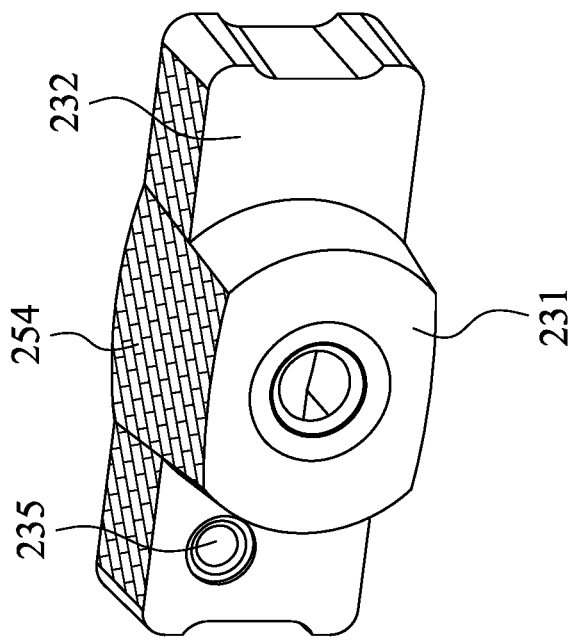
FIG. 2H is a three-dimensional schematic view of the barrel according to the 2nd embodiment of FIG. 2A.
Figure 2J:
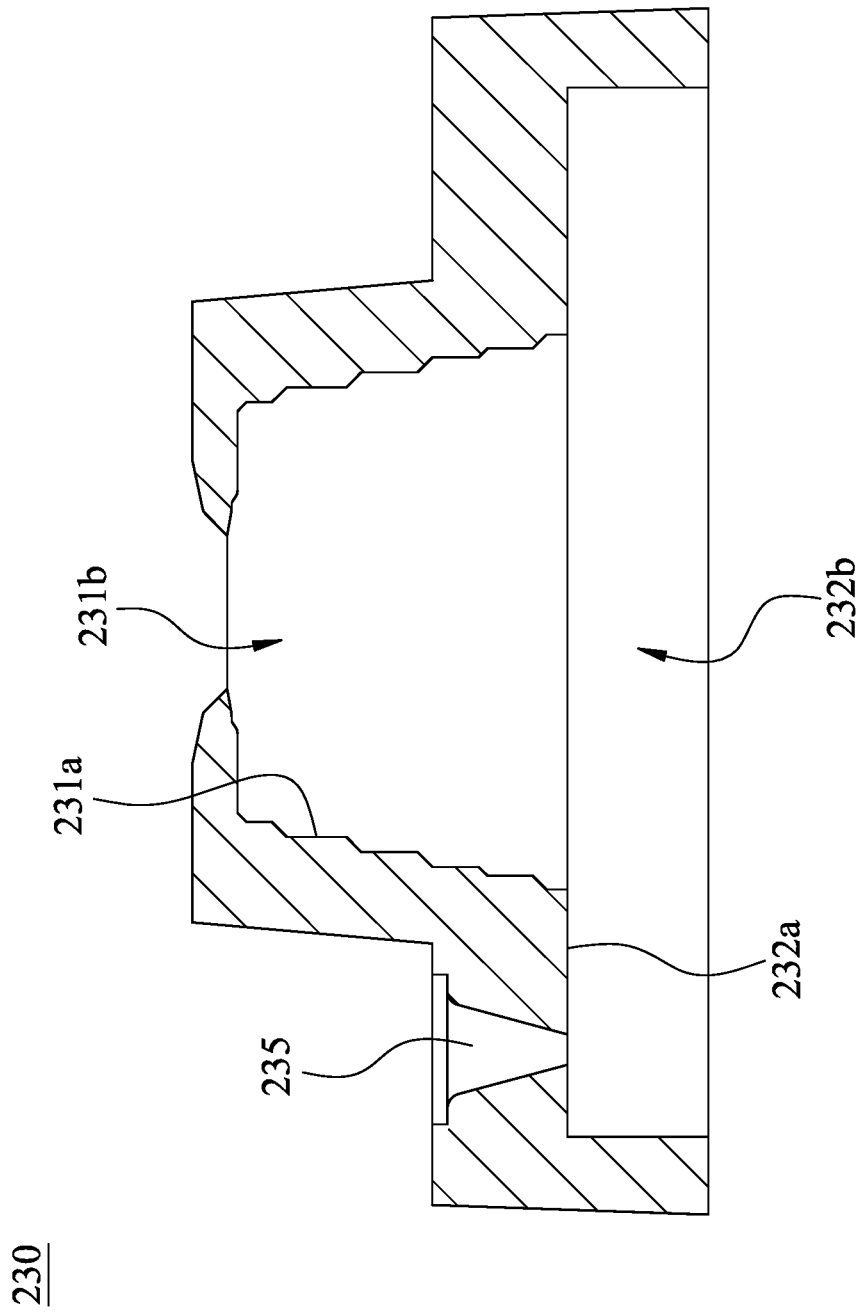
FIG. 2J is a cross-sectional view of the barrel according to the 2nd embodiment of FIG. 2A.

Please refer to FIG. 2G to FIG. 2J, wherein FIG. 2G is a schematic view of parameters of the barrel 230 according to the 2nd embodiment of FIG. 2A, FIG. 2H is a three-dimensional schematic view of the barrel 230 according to the 2nd embodiment of FIG. 2A, FIG. 2I is another three-dimensional schematic view of the barrel 230 according to the 2nd embodiment of FIG. 2A, and FIG. 2J is a cross-sectional view of the barrel 230 according to the 2nd embodiment of FIG. 2A. As shown in FIG. 2G to FIG. 2J, the barrel 230 includes a barrel portion 231 and a base portion 232, wherein the barrel portion 231 has a first inner surface 231a, a first inner space 231b is defined by the first inner surface 231a, and the imaging lens set is disposed in the first inner space 231b. The base portion 232 has a second inner surface 232a, a second inner space 232b is defined by the second inner surface 232a, and the base portion 232 extends from the barrel portion 231 along the optical axis X and substantially contacts the baseplate 210, so that a fixed distance is maintained between the barrel portion 231 and an image surface. In particular, the barrel 230 can be a non-threaded structure, and a bottom surface of the base portion 232 can be fixedly connected to the baseplate 210 directly. Furthermore, the barrel portion 231 and the base portion 232 are formed integrally, so that it is favorable for simplifying the assembly procedure of the imaging lens assembly module 200, the production efficiency thereof can be improved, and the skew errors between the conventional imaging lens assembly and the base portion during the assembly thereof can be avoided.

Furthermore, the barrel portion 231 of the barrel 230 includes two second trimmed surfaces 252, wherein the second trimmed surfaces 252 are disposed symmetrically along the optical axis X. The second trimmed surfaces 252 are disposed on the first inner surface 231a corresponding to the first trimmed surfaces 251, and the second trimmed surfaces 252 are trimmed from the first inner surface 231a to the direction close to the optical axis X, so that a contour of the first inner surface 231a is non-circular along the optical axis X. In the 2nd embodiment, the second trimmed surfaces 252 can be curved surfaces.

Furthermore, by the arrangement of the first trimmed surfaces 251 of the lens element 224 and the second trimmed surfaces 252 of the barrel portion 231, it is favorable for reducing the size along the direction perpendicular to the optical axis X of the imaging lens assembly module 200, and the miniaturization demands of the imaging lens assembly module 200 can be achieved. In other words, the imaging lens assembly module 200 can still be assembled in a limited space.

As shown in FIG. 2A, the lens element closest to the image side (that is, the lens element 224) of the lens elements 221, 222, 223, 224 includes the first trimmed surfaces 251. Therefore, it is favorable for achieving the miniaturization of the imaging lens assembly module 200. In particular, the first trimmed surfaces 251 are disposed starting from the lens element having the largest diameter.

Furthermore, at least two of the lens elements adjacent to each other from the lens element closest to the image side (that is, the lens element 224) to the object side include the first trimmed surfaces 251 (as the marks shown in the lens element 224). Therefore, it can be applied to the notebook computer with a narrow bezel, but the present disclosure is not limited thereto.

Furthermore, each of the lens elements 221, 222, 223, 224 from the object side to the image side includes the first trimmed surfaces 251 (as the marks shown in the lens element 224), and all of the light-blocking elements 241, 242, 243 and the fixing element 244 include trimmed portions. Therefore, the size of the imaging lens assembly module 200 along the direction perpendicular to the optical axis X can be further reduced. In particular, under the condition that all of the lens element closest to the object side (that is, the lens element 221) to the lens element closest to the image side (that is, the lens element 224) include the first trimmed surfaces 251 (as the marks shown in the lens element 124), the image quality of the imaging lens assembly module 200 can be maintained and the high production yield can be obtained simultaneously.

As shown in FIG. 2C, the first trimmed surfaces 251 and the second trimmed surfaces 252 are arranged air-gapped, and an air space G is disposed between the first trimmed surfaces 251 and the second trimmed surfaces 252. Therefore, the assembly errors caused by over-constrained of the lens elements 221, 222, 223, 224 can be avoided.

As shown in FIG. 2D and FIG. 2F, the lens elements 221, 222, 223, 224 further respectively include an edge portion 224b (as the marks shown in the lens element 224) and an optical effective portion 224c (as the marks shown in the lens element 224), and the edge portion 224b is farther away from the optical axis X than the optical effective portion 224c. The optical effective portion 224c has a refractive power, and a contour of the first trimmed surfaces 251 is non-circular along the optical axis X due to the optical effective portion 224c.

The base portion 232 further includes two third trimmed surfaces 253, wherein the third trimmed surfaces 253 are disposed symmetrically along the optical axis X, the third trimmed surfaces 253 are disposed on the second inner surface 232a, and the third trimmed surfaces 253 are trimmed from the second inner surface 232a to the direction close to the optical axis X, so that a contour of the base portion 232 is non-circular along the optical axis X. Therefore, the size of the barrel 230 can be further compressed along the direction perpendicular to the optical axis X, and thus the space needed for the assembly of the baseplate 210 can be reduced. In the 2nd embodiment, the third trimmed surfaces 253 can be the combination of planes and curved surfaces.

The base portion 232 further includes a matting layer disposed on the second inner surface 232a. Therefore, it is favorable for preventing the reflection of the non-imaging lights generated inside the base portion 232 and from affecting the image quality. In particular, the matting layer can be an anti-reflect structure or can be formed by sand blasting process or coating process, but the present disclosure is not limited thereto.

As shown in FIG. 2A and FIG. 2C, the base portion 232 includes an IR filter 234, wherein the IR filter 234 is disposed in the second inner space 232b. Therefore, it is favorable for filtering the infrared light and enhancing the image quality.

As shown in FIG. 2H and FIG. 2I, the barrel 230 further includes two fourth trimmed surfaces 254, wherein the fourth trimmed surfaces 254 are disposed symmetrically along the optical axis X, and the fourth trimmed surfaces 254 are disposed on an outer surface of the barrel 230. The fourth trimmed surfaces 254 are trimmed from the outer surface of the barrel 230 to the direction close to the optical axis X, and the fourth trimmed surfaces 254 extend along the optical axis X from the barrel portion 231 to the base portion 232, so that a contour of the barrel 230 is non-circular along the optical axis X. In the 2nd embodiment, the fourth trimmed surfaces 254 can be the combination of planes and curved surfaces. It must be noted that the pattern of each of the trimmed surfaces (those are, the second trimmed surfaces 252, the third trimmed surfaces 253, and the fourth trimmed surfaces 254) is only used to illustrate the area of the trimmed surface and does not form a part of the structure of each of the trimmed surfaces.

The lens element closest to the image side (that is, the lens element 224) of the lens elements is connected to the barrel 230 by an adhesive dispensing process. By the arrangement that the lens element is fixed by the adhesive dispensing process, it is favorable for enhancing the production efficiency thereof, and the assembling stability thereof can be also enhanced. In particular, the adhesive used in the adhesive dispensing process is disposed on the edge portion 224b and is connected to the barrel 230, and the adhesive can be a black glue so as to reduce the reflectivity of the non-imaging lights. Furthermore, adhesive dispensing structures can be disposed on an inner surface of the barrel 230, and the glue filling condition thereof can be assessed through an image recognition method.

As shown in FIG. 2A, FIG. 2B, FIG. 2D, FIG. 2H, FIG. 2I and FIG. 2J, the base portion 232 includes a vent 235, wherein the vent 235 communicates the second inner space 232b and an external space of the barrel 230, the vent 235 extends along a direction parallel to the optical axis X, and the vent 235 is reduced gradually from the barrel portion 231 to the base portion 232. By the arrangement that the vent 235 communicates the second inner space 232b and the external space of the barrel 230, the air pressure there between can be balanced, so that the shift of the imaging lens assembly module 200 caused by the internal air pressure during the assembly process of the imaging lens assembly module 200 can be avoided.

As shown in FIG. 2A, the imaging lens assembly module 200 further includes a light path turning element 260, wherein the light path turning element 260 is for guiding a light to the imaging lens assembly. In detail, the light path turning element 260 can be a prism or a reflecting mirror and can be disposed between the imaging lens assembly and the light entrance, but the present disclosure is not limited thereto.

As shown in FIG. 2C, FIG. 2D and FIG. 2G, a shortest distance is defined between the first trimmed surfaces 251 of the lens element 224, a shortest distance is defined between the second trimmed surfaces 252 of the barrel portion 231, and the optical axis X passes vertically through the shortest distance between the first trimmed surfaces 251 and the shortest distance between the second trimmed surfaces 252. When the shortest distance between the first trimmed surfaces 251 is L1, the shortest distance between the second trimmed surfaces 252 is L2, a diameter of the lens element 224 is $\varphi$, a height of the base portion 232 of the barrel 230 along the optical axis X is H1, a height of the barrel 230 as entire along the optical axis X is H, a first shortest width is defined between the fourth trimmed surfaces 254 of the barrel 230 closest to the image side, a second shortest width is defined between the fourth trimmed surfaces 254 of the barrel 230 closest to the object side, the optical axis X passes vertically through the first shortest width and the second shortest width, there is a width difference between the first shortest width and the second shortest width, the first shortest width is W1, the second shortest width is W2, the width difference is $\Delta W$, and a diameter of the optical effective portion of each of the lens elements 221, 222, 223, 224 (as the marks shown in the optical effective portion 224c of the lens element 224) is $\varphi$eff, the aforementioned parameters satisfy the conditions shown in Table 2.

TABLE 2

| 2nd Embodiment | | | |
|---|---|---|---|
| L1 (mm) | 1.18 | $\Delta W$ | 0.22 |
| L2 (mm) | 1.21 | $\varphi$eff (mm) | 1.4 |
| $\varphi$ (mm) | 1.7 | H1/H | 0.53 |
| H1 (mm) | 0.92 | L1/$\varphi$ | 0.69 |
| H (mm) | 1.72 | $\Delta W$/2 | 0.11 |
| W1 (mm) | 1.82 | (W1 + W2)/2 | 1.71 |
| W2 (mm) | 1.6 | | |

In the 2nd embodiment, the shortest distance between the first trimmed surfaces 251 and the diameter of the optical effective portion 224c of the lens element 224 satisfy the following condition: L1<$\varphi$eff.

3rd Embodiment

Figure 3A:
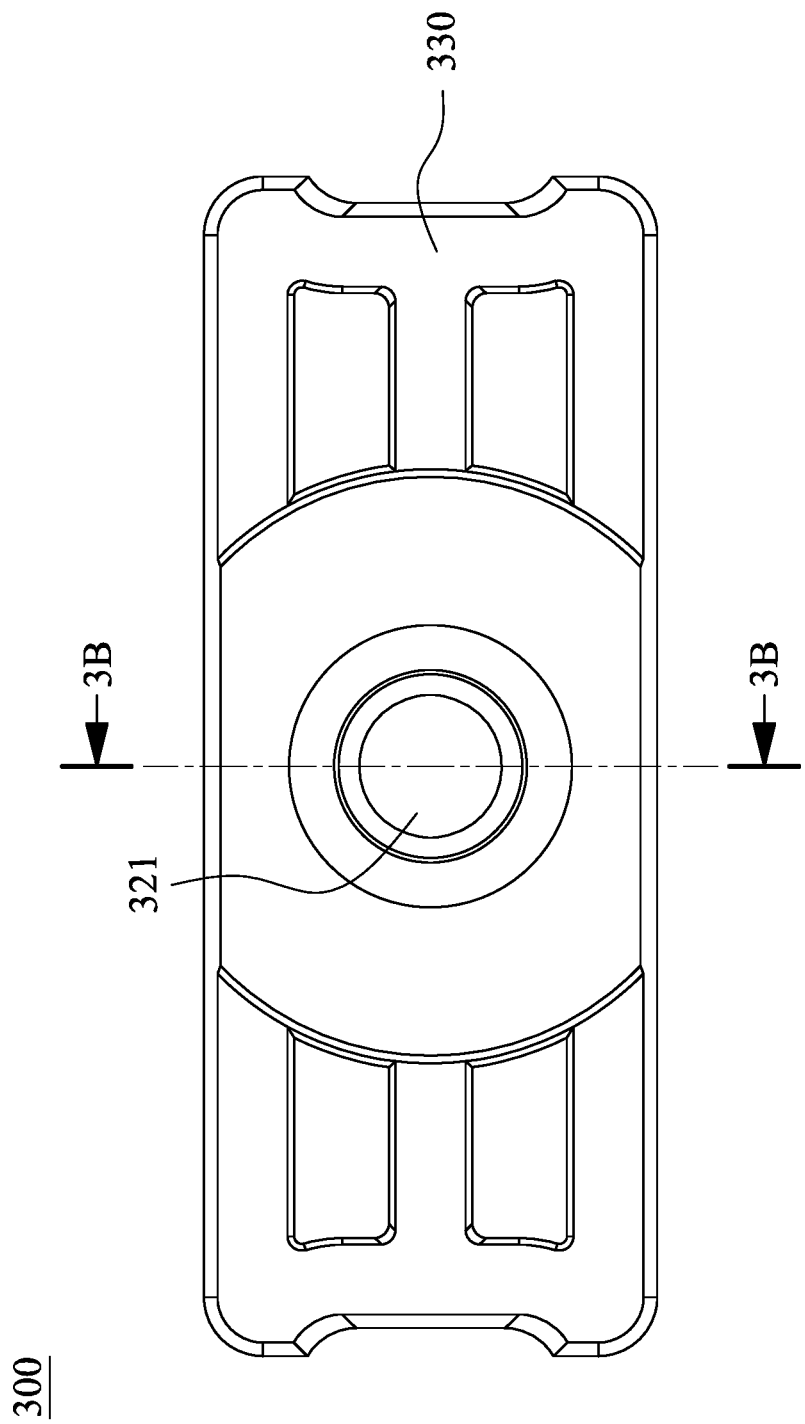
FIG. 3A is a schematic view of an imaging lens assembly module according to the 3rd embodiment of the present disclosure.
Figure 3B:
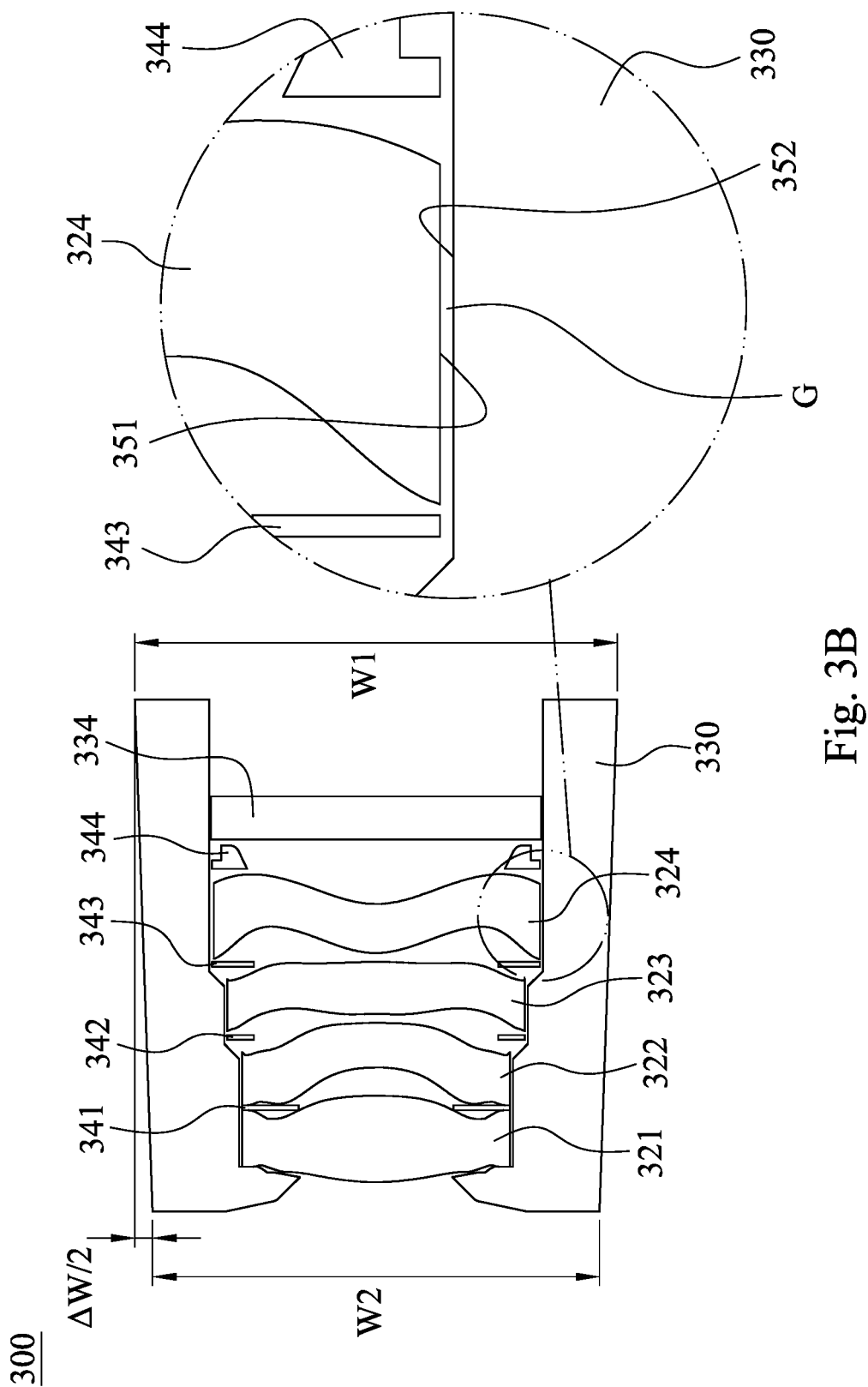
FIG. 3B is a cross-sectional view of the imaging lens assembly module according to the 3rd embodiment of FIG. 3A along line 3B-3B.

FIG. 3A is a schematic view of an imaging lens assembly module 300 according to the 3rd embodiment of the present disclosure, and FIG. 3B is a cross-sectional view of the imaging lens assembly module 300 according to the 3rd embodiment of FIG. 3A along line 3B-3B. As shown in FIG. 3A and FIG. 3B, the imaging lens assembly module 300 includes a baseplate (not shown) and an imaging lens assembly (reference number is omitted), wherein the baseplate includes an image sensor (not shown), the imaging lens assembly is passed through by an optical axis (reference number is omitted), and the imaging lens assembly includes an imaging lens set (reference number is omitted) and a barrel 330. In particular, the imaging lens assembly module 300 can be an imaging lens assembly module of a notebook computer or an imaging lens assembly module of a portable device, but the present disclosure is not limited thereto.

As shown in FIG. 3B, the imaging lens set includes at least one lens element, wherein a number of the lens elements of the imaging lens set can be plural, and the imaging lens set can further include a light-blocking element and a fixing element. In the 3rd embodiment, the imaging lens set includes, in order from an object side to an image side, a lens element 321, a light-blocking element 341, a lens element 322, a light-blocking element 342, a lens element 323, a light-blocking element 343, a lens element 324 and a fixing element 344. It must be noted that the number of the lens elements and the optical elements, structures, surface shapes and other optical characteristics can be arranged according to actual image requirements, and the present disclosure is not limited thereto.

The lens element 324 includes two first trimmed surfaces 351, wherein the first trimmed surfaces 351 are disposed symmetrically along the optical axis, and the first trimmed surfaces 351 are trimmed from an outer annular surface (reference number is omitted) of the lens element 324 to a direction close to the optical axis, so that a contour of the lens element 324 is non-circular along the optical axis. In the 3rd embodiment, the first trimmed surfaces 351 can be planes.

Figure 3C:
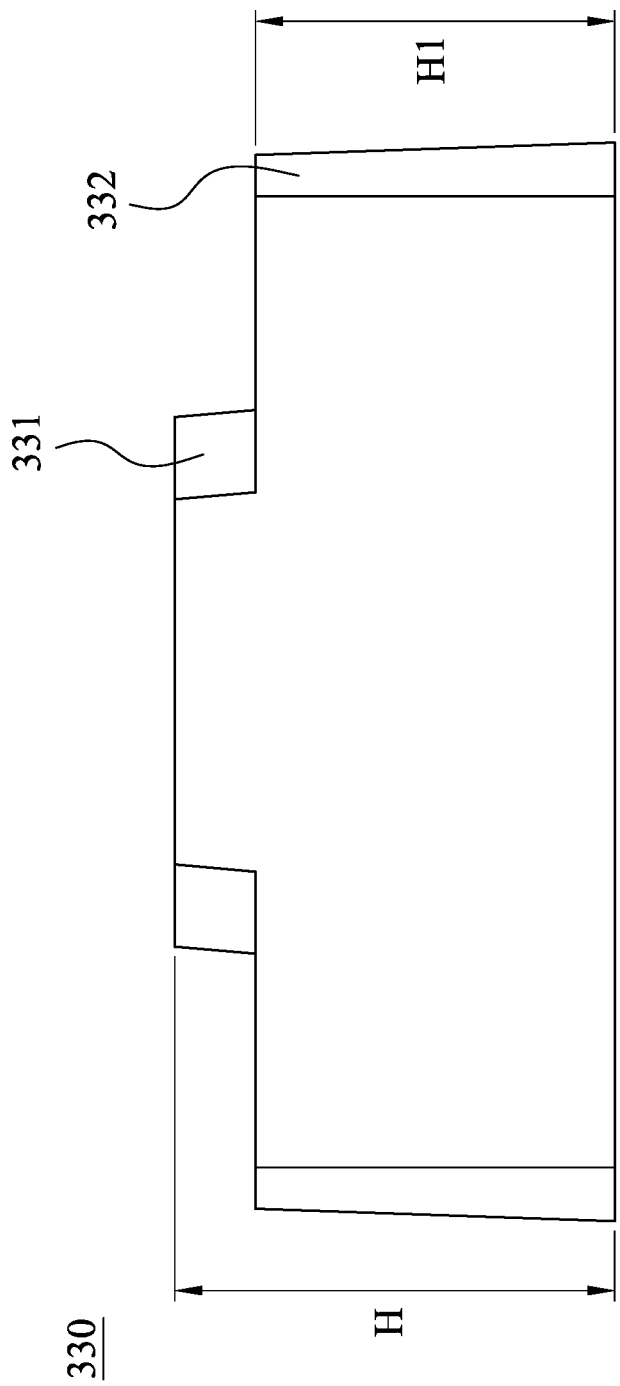
FIG. 3C is a schematic view of parameters of a barrel according to the 3rd embodiment of FIG. 3A.
Figure 3E:
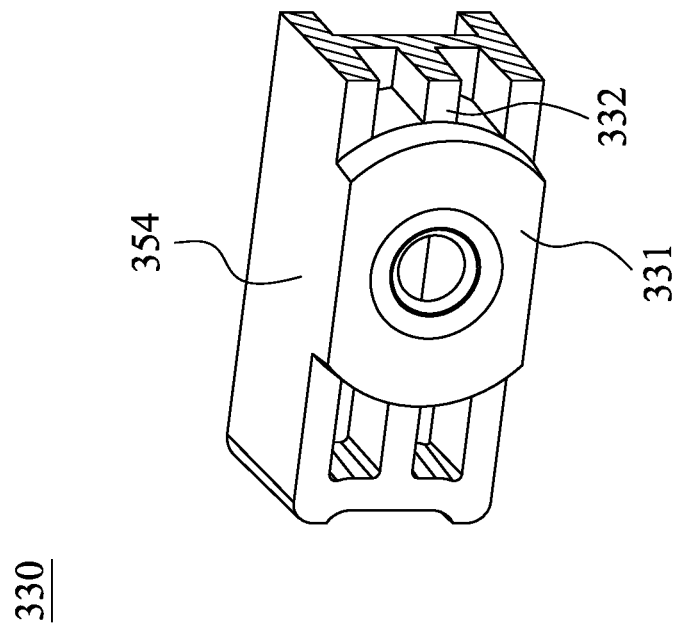
FIG. 3E shows a cross-sectional surface of the barrel according to the 3rd embodiment of FIG. 3D.
Figure 3D:
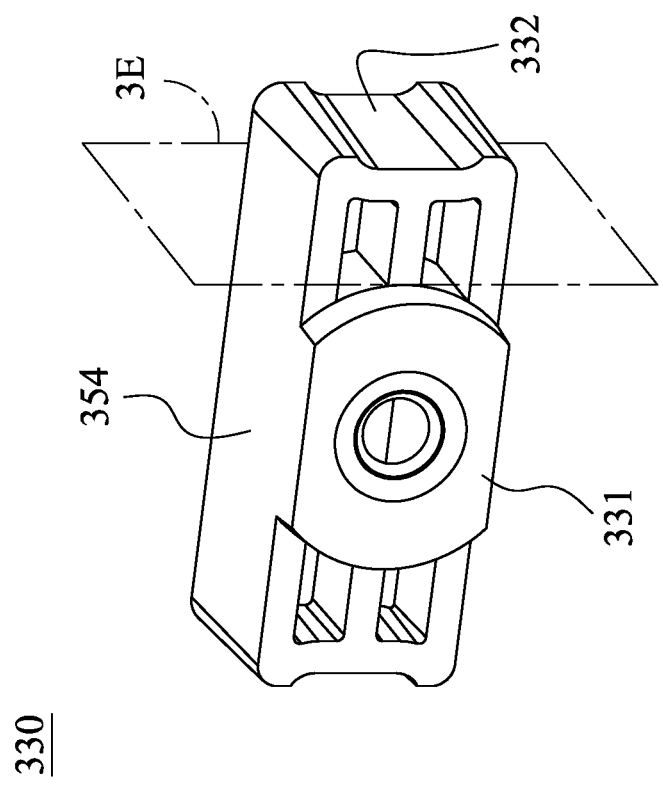
FIG. 3D is a three-dimensional schematic view of the barrel according to the 3rd embodiment of FIG. 3A.
Figure 3F:
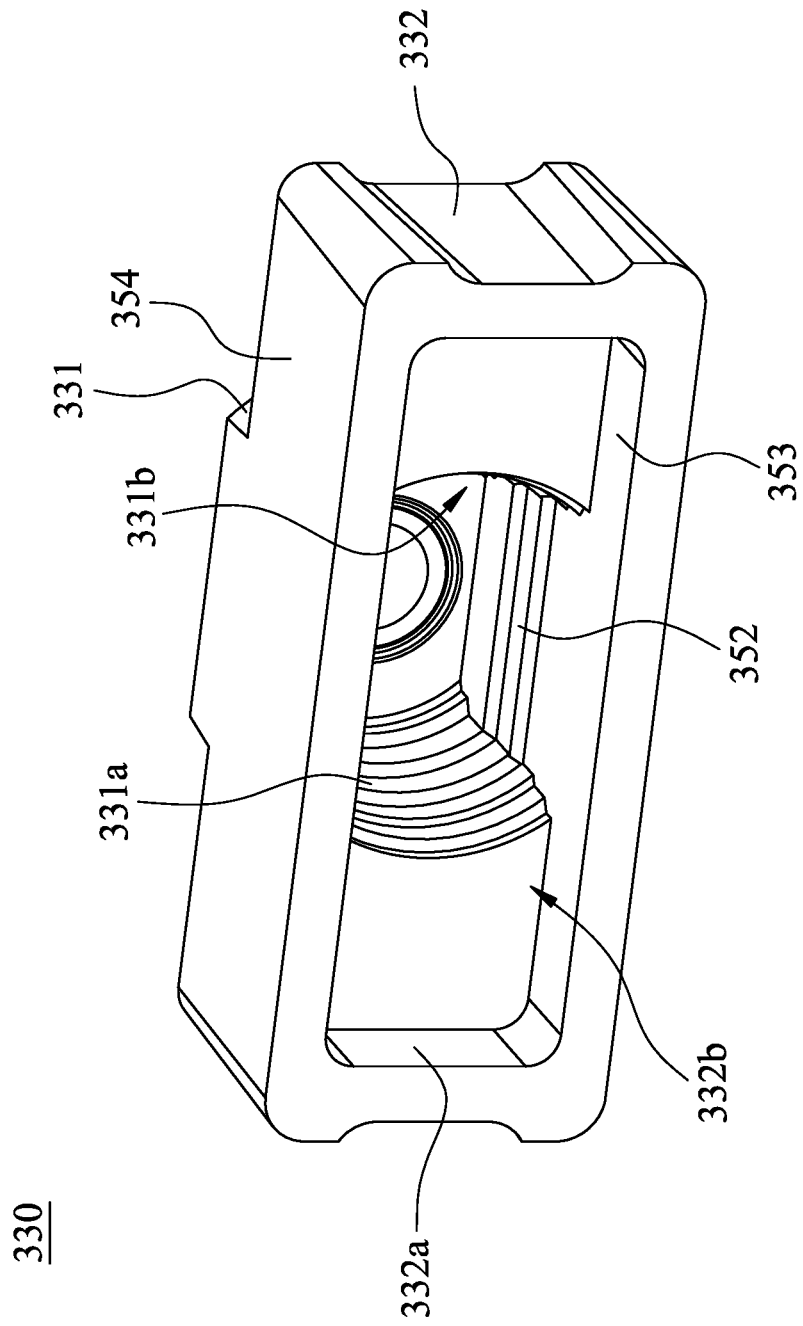
FIG. 3F is another three-dimensional schematic view of the barrel according to the 3rd embodiment of FIG. 3A.

Please refer to FIG. 3C to FIG. 3F, wherein FIG. 3C is a schematic view of parameters of a barrel 330 according to the 3rd embodiment of FIG. 3A, FIG. 3D is a three-dimensional schematic view of the barrel 330 according to the 3rd embodiment of FIG. 3A, FIG. 3E shows a cross-sectional surface of the barrel 330 according to the 3rd embodiment of FIG. 3D, and FIG. 3F is another three-dimensional schematic view of the barrel 330 according to the 3rd embodiment of FIG. 3A. As shown in FIG. 3C to FIG. 3F, the barrel 330 includes a barrel portion 331 and a base portion 332, wherein the barrel portion 331 has a first inner surface 331a, a first inner space 331b is defined by the first inner surface 331a, and the imaging lens set is disposed in the first inner space 331b. The base portion 332 has a second inner surface 332a, a second inner space 332b is defined by the second inner surface 332a, and the base portion 332 extends from the barrel portion 331 along the optical axis and substantially contacts the baseplate, so that a fixed distance is maintained between the barrel portion 331 and an image surface. In particular, the barrel 330 can be a non-threaded structure, and a bottom surface of the base portion 332 can be fixedly connected to the baseplate directly. Furthermore, the barrel portion 331 and the base portion 332 are formed integrally, so that it is favorable for simplifying the assembly procedure of the imaging lens assembly module 300, the production efficiency thereof can be improved, and the skew errors between the conventional imaging lens assembly and the base portion during the assembly thereof can be avoided.

Furthermore, the barrel portion 331 of the barrel 330 includes two second trimmed surfaces 352, wherein the second trimmed surfaces 352 are disposed symmetrically along the optical axis. The second trimmed surfaces 352 are disposed on the first inner surface 331a corresponding to the first trimmed surfaces 351, and the second trimmed surfaces 352 are trimmed from the first inner surface 331a to the direction close to the optical axis, so that a contour of the first inner surface 331a is non-circular along the optical axis. In the 3rd embodiment, the second trimmed surfaces 352 can be planes.

Furthermore, by the arrangement of the first trimmed surfaces 351 of the lens element 324 and the second trimmed surfaces 352 of the barrel portion 331, it is favorable for reducing the size along the direction perpendicular to the optical axis of the imaging lens assembly module 300, and the miniaturization demands of the imaging lens assembly module 300 can be achieved. In other words, the imaging lens assembly module 300 can still be assembled in a limited space.

As shown in FIG. 3B, the first trimmed surfaces 351 and the second trimmed surfaces 352 are arranged air-gapped, and an air space G is disposed between the first trimmed surfaces 351 and the second trimmed surfaces 352. Therefore, the assembly errors caused by over-constrained of the lens elements 321, 322, 323, 324 can be avoided.

The base portion 332 further includes two third trimmed surfaces 353, wherein the third trimmed surfaces 353 are disposed symmetrically along the optical axis, the third trimmed surfaces 353 are disposed on the second inner surface 332a, and the third trimmed surfaces 353 are trimmed from the second inner surface 332a to the direction close to the optical axis, so that a contour of the base portion 332 is non-circular along the optical axis. Therefore, the size of the barrel 330 can be further compressed along the direction perpendicular to the optical axis, and thus the space needed for the assembly of the baseplate can be reduced. In the 3rd embodiment, the third trimmed surfaces 353 can be planes.

The base portion 332 further includes a matting layer disposed on the second inner surface 332a. Therefore, it is favorable for preventing the reflection of the non-imaging lights generated inside the base portion 332 and from affecting the image quality. In particular, the matting layer can be an anti-reflect structure or can be formed by sand blasting process or coating process, but the present disclosure is not limited thereto.

As shown in FIG. 3B, the base portion 332 includes an IR filter 334, wherein the IR filter 334 is disposed in the second inner space 332b. Therefore, it is favorable for filtering the infrared light and enhancing the image quality.

As shown in FIG. 3D to FIG. 3F, the barrel 330 further includes two fourth trimmed surfaces 354, wherein the fourth trimmed surfaces 354 are disposed symmetrically along the optical axis, and the fourth trimmed surfaces 354 are disposed on an outer surface of the barrel 330. The fourth trimmed surfaces 354 are trimmed from the outer surface of the barrel 330 to the direction close to the optical axis, and the fourth trimmed surfaces 354 extend along the optical axis from the barrel portion 331 to the base portion 332, so that a contour of the barrel 330 is non-circular along the optical axis. In the 3rd embodiment, the fourth trimmed surfaces 354 can be planes.

The lens element closest to the image side (that is, the lens element 324) of the lens elements is connected to the barrel 330 by an adhesive dispensing process. By the arrangement that the lens element is fixed by the adhesive dispensing process, it is favorable for enhancing the production efficiency thereof, and the assembling stability thereof can be also enhanced. In particular, the adhesive used in the adhesive dispensing process is disposed on the edge portion (reference number is omitted) and is connected to the barrel 330, and the adhesive can be a black glue so as to reduce the reflectivity of the non-imaging lights. Furthermore, adhesive dispensing structures can be disposed on an inner surface of the barrel 330, and the glue filling condition thereof can be assessed through an image recognition method.

As shown in FIG. 3B and FIG. 3C, a height of the base portion 332 of the barrel 330 along the optical axis is a first shortest width is defined between the fourth trimmed surfaces 354 of the barrel 330 closest to the image side, a second shortest width is defined between the fourth trimmed surfaces 354 of the barrel 330 closest to the object side, the optical axis X passes vertically through the first shortest width and the second shortest width, there is a width difference between the first shortest width and the second shortest width, the first shortest width is W1, the second shortest width is W2, the width difference is ΔW, and the aforementioned parameters satisfy the conditions shown in Table 3.

TABLE 3

| | 3rd Embodiment | | |
|---|---|---|---|
| H1 (mm) | 1.4 | ΔW | 0.12 |
| H (mm) | 1.72 | H1/H | 0.81 |
| W1 (mm) | 1.62 | ΔW/2 | 0.06 |
| W2 (mm) | 1.5 | (W1 + W2)/2 | 1.56 |

Furthermore, the structures and the arranging relationships of other elements of the 3rd embodiment are the same with those of the 1st embodiment, and the details thereof are not described again herein.

4th Embodiment

Figure 4:
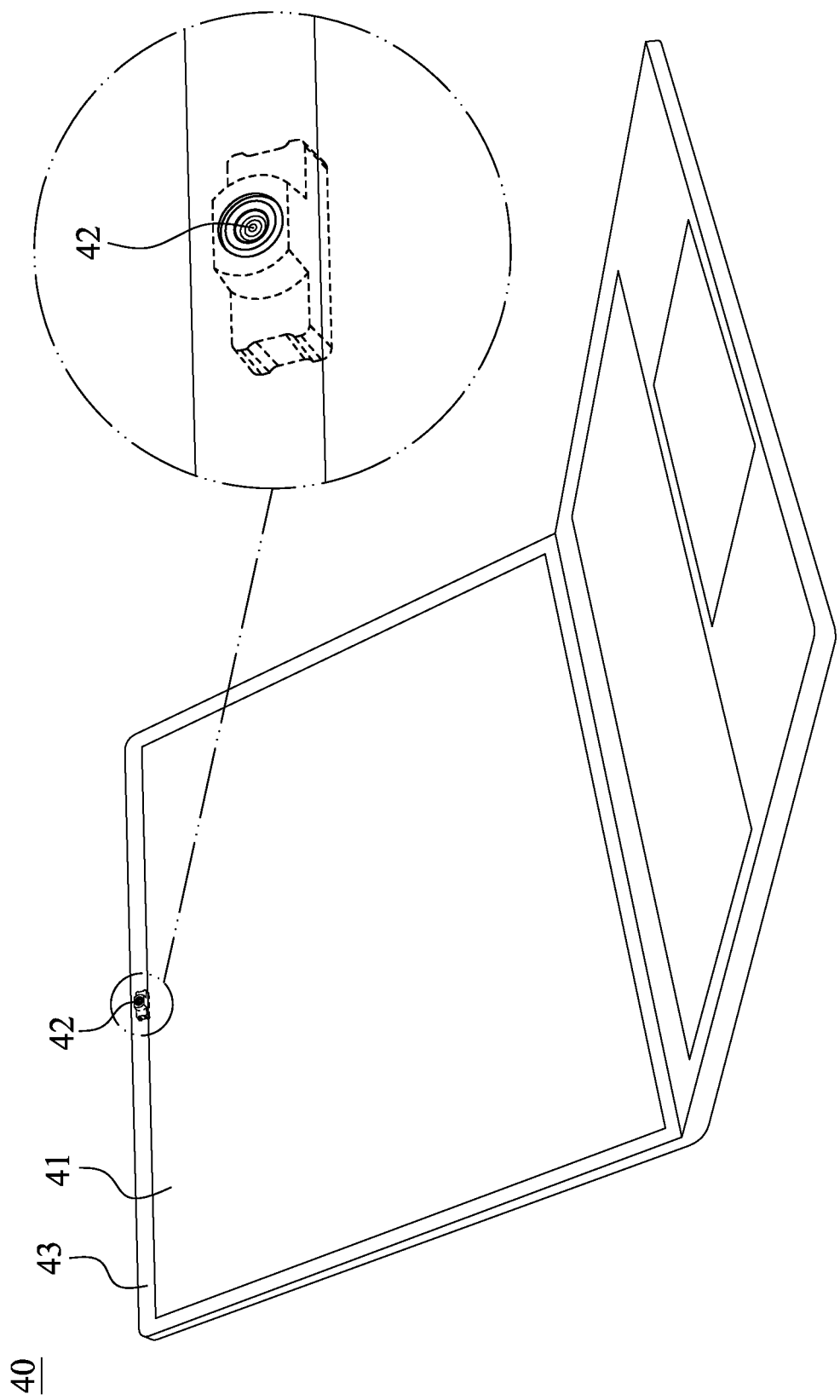
FIG. 4 is a schematic view of an electronic device according to the 4th embodiment of the present disclosure.
Figure 5B:
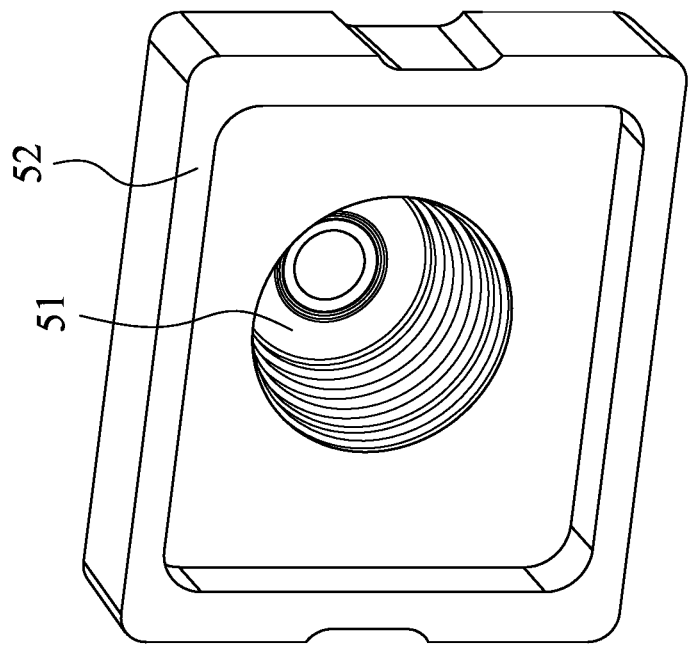
FIG. 5B is another schematic view of the barrel according to the prior art of FIG. 5A.
Figure 5A:
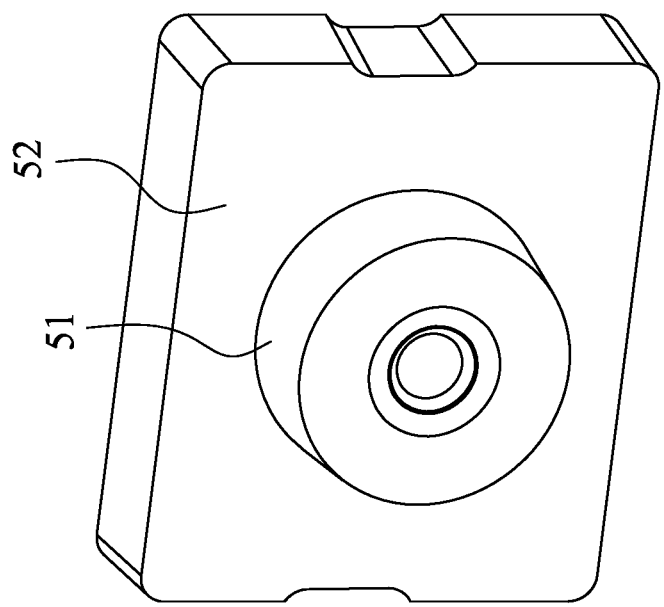
FIG. 5A is a schematic view of a barrel according to the prior art.

FIG. 4 is a schematic view of an electronic device 40 according to the 4th embodiment of the present disclosure. As shown in FIG. 4, the electronic device 40 is a notebook computer and includes a panel screen 41 and an imaging lens assembly module 42, wherein a screen to body ratio of the panel screen 41 to the electronic device 40 is at least 92%. Furthermore, the screen to body ratio of the panel screen 41 to the electronic device 40 can be at least 95%. In particular, the imaging lens assembly module 42 can be the imaging lens assembly modules of the 1st embodiment to the 3rd embodiment, and the imaging lens assembly module 42 is disposed on a frame 43 of the panel screen 41, but the present disclosure is not limited thereto.

Specifically, the user activates the capturing mode by the panel screen 41 of the electronic device 40. At this moment, imaging lens assembly module 42 collects imaging light on the image sensor (not shown) of the electronic device 40 and outputs electronic signals associated with images to an image signal processor (ISP) (not shown).

Furthermore, the imaging lens assembly module and the image sensor can be disposed on a flexible printed circuit board (FPC) (not shown) and electrically connected to the associated elements, such as an image signal processor, via a connector so as to perform a capturing process. Because the current electronic devices have a tendency of being light and thin, the way of disposing the imaging lens assembly module and related elements on the flexible printed circuit board, and then integrating the circuit into the main board of the electronic device via the connector can satisfy the mechanical design of the limited space inside the electronic device and the layout requirements, and obtain more margins.

Moreover, the electronic device 40 can further include, but not be limited to, a display, a control unit, a storage unit, a random-access memory (RAM), a read-only memory (ROM), or the combination thereof.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly module, comprising:
a baseplate, comprising:
an image sensor; and
an imaging lens assembly passed through by an optical axis, comprising:
an imaging lens set, comprising:
at least one lens element comprising two first trimmed surfaces, wherein the first trimmed surfaces are disposed symmetrically along the optical axis, and the first trimmed surfaces are trimmed from an outer annular surface of the at least one lens element to a direction close to the optical axis, so that a contour of the at least one lens element is non-circular along the optical axis; and
a barrel, comprising:
a barrel portion having a first inner surface, wherein a first inner space is defined by the first inner surface, the imaging lens set is disposed in the first inner space, and the barrel portion comprises:
two second trimmed surfaces disposed symmetrically along the optical axis, wherein the second trimmed surfaces are disposed on the first inner surface corresponding to the first trimmed surfaces, and the second trimmed surfaces are trimmed from the first inner surface to the direction close to the optical axis, so that a contour of the first inner surface is non-circular along the optical axis; and
a base portion having a second inner surface, wherein a second inner space is defined by the second inner surface, and the base portion extends from the barrel portion along the optical axis and substantially contacts the baseplate, so that a fixed distance is maintained between the barrel portion and an image surface;
wherein the first trimmed surfaces and the second trimmed surfaces are arranged air-gapped, and there is an air space disposed between the first trimmed surfaces and the second trimmed surfaces;
wherein the barrel portion and the base portion are formed integrally, a shortest distance is defined between the first trimmed surfaces of the at least one lens element, a shortest distance is defined between the second trimmed surfaces of the barrel portion, and the optical axis passes vertically through the shortest distance between the first trimmed surfaces and the shortest distance between the second trimmed surfaces;
wherein the shortest distance between the first trimmed surfaces is L1, the shortest distance between the second trimmed surfaces is L2, a diameter of the at least one lens element is φ, and the following condition is satisfied:

$$L1 < L2 < \varphi.$$

2. The imaging lens assembly module of claim 1, wherein a height of the base portion of the barrel along the optical axis is H1, a height of the barrel as entire along the optical axis is H, and the following condition is satisfied:

$$0.13 < H1/H < 0.84.$$

3. The imaging lens assembly module of claim 2, wherein the shortest distance between the first trimmed surfaces is L1, the diameter of the at least one lens element is o, and the following condition is satisfied:

$$0.5 < L1/\varphi < 0.8.$$

4. The imaging lens assembly module of claim 2, wherein the base portion comprises two third trimmed surfaces, the third trimmed surfaces are disposed symmetrically along the optical axis, the third trimmed surfaces are disposed on the second inner surface, and the third trimmed surfaces are trimmed from the second inner surface to the direction close to the optical axis, so that a contour of the base portion is non-circular along the optical axis.

5. The imaging lens assembly module of claim 4, wherein the base portion further comprises a matting layer, and the matting layer is disposed on the second inner surface.

6. The imaging lens assembly module of claim 2, wherein the base portion comprises an IR filter, and the IR filter is disposed in the second inner space.

7. The imaging lens assembly module of claim 2, wherein the base portion comprises a vent, the vent communicates the second inner space and an external space of the barrel, the vent extends along a direction parallel to the optical axis, and the vent is reduced gradually from the barrel portion to the base portion.

8. The imaging lens assembly module of claim 2, wherein a number of the at least one lens element of the imaging lens set is plural, and one of the lens elements closest to an image side comprises the first trimmed surfaces.

9. The imaging lens assembly module of claim 8, wherein the barrel further comprises two fourth trimmed surfaces, the fourth trimmed surfaces are disposed symmetrically along the optical axis, the fourth trimmed surfaces are disposed on an outer surface of the barrel, the fourth trimmed surfaces are trimmed from the outer surface of the barrel to the direction close to the optical axis, and the fourth trimmed surfaces extend along the optical axis from the barrel portion to the base portion, so that a contour of the barrel is non-circular along the optical axis.

10. The imaging lens assembly module of claim 9, wherein at least two of the lens elements adjacent to each other from the lens element closest to the image side to an object side comprise the first trimmed surfaces.

11. The imaging lens assembly module of claim 9, wherein each of the lens elements from an object side to the image side comprises the first trimmed surfaces.

12. The imaging lens assembly module of claim 9, wherein a first shortest width is defined between the fourth trimmed surfaces of the barrel closest to the image side, the optical axis passes vertically through the first shortest width, the first shortest width is W1, and the following condition is satisfied:

0.8 mm<$W1$<2.2 mm.

13. The imaging lens assembly module of claim 12, wherein a second shortest width is defined between the fourth trimmed surfaces of the barrel closest to an object side, the optical axis passes vertically through the second shortest width, the first shortest width is W1, the second shortest width is W2, and the following condition is satisfied:

0.7 mm<($W1$+$W2$)/2<2.1 mm.

14. The imaging lens assembly module of claim 9, wherein a first shortest width is defined between the fourth trimmed surfaces of the barrel closest to the image side, a second shortest width is defined between the fourth trimmed surfaces of the barrel closest to an object side, the optical axis passes vertically through the first shortest width and the second shortest width, there is a width difference between the first shortest width and the second shortest width, the first shortest width is W1, the second shortest width is W2, the width difference is ΔW, and the following conditions are satisfied:

$\Delta W = |W1 - W2|$; and 0.005 mm<$\Delta W$/2<0.2 mm.

15. The imaging lens assembly module of claim 8, wherein the lens element closest to the image side of the lens elements is connected to the barrel by an adhesive dispensing process.

16. The imaging lens assembly module of claim 8, wherein the lens elements respectively comprise an edge portion and an optical effective portion, the edge portion is farther away from the optical axis than the optical effective portion, the optical effective portion has a refractive power, and a contour of the optical effective portion is non-circular along the optical axis due to the first trimmed surfaces;

wherein the shortest distance between the first trimmed surfaces is L1, a diameter of the optical effective portion of each of the lens element is φeff, and the following condition is satisfied:

$L1 < \varphi eff$.

17. The imaging lens assembly module of claim 1, further comprising:
a light path turning element for guiding a light to the imaging lens assembly.

18. An electronic device, comprising:
a panel screen; and
the imaging lens assembly module of claim 1, wherein the imaging lens assembly module is disposed close to the panel screen peripherally;
wherein a screen to body ratio of the panel screen to the electronic device is at least 92%.

19. The electronic device of claim 18, wherein the screen to body ratio of the panel screen to the electronic device is at least 95%.

20. The electronic device of claim 19, wherein the electronic device is a notebook computer.

* * * * *